United States Patent
Bovet et al.

(10) Patent No.: US 9,834,940 B2
(45) Date of Patent: Dec. 5, 2017

(54) MODULAR BUILDING STRUCTURES IMPROVEMENTS

(71) Applicant: 3088-7418 QUEBEC INC. MAD MAB CORP., Ville Mont-Royal (CA)

(72) Inventors: Marc-Andre Bovet, Ville Mont-Royal (CA); Michelle Tremblay, Ville Mont Royal (CA)

(73) Assignee: 9344-8462 Québec Inc., Laval (CA)

( * ) Notice: Subject to any disclaimer, the term of this patent is extended or adjusted under 35 U.S.C. 154(b) by 0 days.

(21) Appl. No.: 14/733,483

(22) Filed: Jun. 8, 2015

(65) Prior Publication Data

US 2015/0267393 A1    Sep. 24, 2015

Related U.S. Application Data

(63) Continuation-in-part of application No. 13/696,458, filed as application No. PCT/CA2011/000532 on May 6, 2011, now abandoned.
(Continued)

(51) Int. Cl.
*E04B 2/74*    (2006.01)
*E04B 5/10*    (2006.01)
(Continued)

(52) U.S. Cl.
CPC ............ *E04F 13/0866* (2013.01); *E04B 1/24* (2013.01); *E04B 5/10* (2013.01); *E04B 5/14* (2013.01); *E04C 3/09* (2013.01); *H02G 3/0456* (2013.01); *H02G 3/385* (2013.01); *E04B 2001/246* (2013.01); *E04B 2001/2409* (2013.01); *E04B 2001/2415* (2013.01); *E04B 2001/2448* (2013.01); *E04B 2001/2457* (2013.01); *E04B 2001/2463* (2013.01); *E04B 2001/2469* (2013.01); *E04B 2001/2472* (2013.01);
(Continued)

(58) Field of Classification Search
None
See application file for complete search history.

(56) References Cited

U.S. PATENT DOCUMENTS 508,280 A    11/1893    Cavallaro
1,097,934 A    5/1914    Price
(Continued)

FOREIGN PATENT DOCUMENTS

DE    20016088 Y    2/2001
EP    0711882    5/1996
(Continued)

OTHER PUBLICATIONS

First Examination Report from Intellectual Property Office of the New Zealand dated Jun. 28, 2013—3 pages.
Supplementary European Search Report.

*Primary Examiner* — James Ference
*Assistant Examiner* — Kyle Walraed-Sullivan
(74) *Attorney, Agent, or Firm* — Benoit & Cote Inc.

(57) ABSTRACT

There is provided building structures that are demountable from a first configuration to be reassemblable to the first configuration or another configuration. The building structures include systems and kits for the structure, post anchors, kits for floor structure, method for assembling floor structures, wall and ceiling support systems, electrical junction box supports, and kits for frame assembly.

15 Claims, 31 Drawing Sheets

Related U.S. Application Data

(60) Provisional application No. 61/331,897, filed on May 6, 2010.

(51) Int. Cl.
  *E04B 5/14* (2006.01)
  *E04C 3/04* (2006.01)
  *E04F 13/08* (2006.01)
  *H02G 3/04* (2006.01)
  *H02G 3/38* (2006.01)
  *E04C 3/09* (2006.01)
  *E04B 1/24* (2006.01)

(52) U.S. Cl.
  CPC .......... *E04B 2001/2475* (2013.01); *E04B 2001/2481* (2013.01); *E04B 2001/2484* (2013.01); *E04B 2001/2496* (2013.01)

(56) References Cited

U.S. PATENT DOCUMENTS

| | | | |
|---|---|---|---|
| 1,540,542 A | 6/1925 | Carhart | |
| 1,923,906 A * | 8/1933 | Berger | E04B 2/7457 52/281 |
| 2,309,451 A | 1/1943 | Hasenburger | |
| 3,477,187 A * | 11/1969 | Fruman | E04F 13/0803 52/346 |
| 3,685,234 A | 8/1972 | Nelsson | |
| 3,751,870 A * | 8/1973 | Vesei | E04B 5/14 105/418 |
| 3,759,001 A | 9/1973 | Judkins | |
| 4,127,975 A | 12/1978 | Judkins | |
| 4,227,360 A * | 10/1980 | Balinski | E04B 2/7457 52/243 |
| 4,281,494 A | 8/1981 | Weinar | |
| 4,338,759 A * | 7/1982 | Swerdlow | E04B 2/86 52/742.14 |
| 4,364,215 A | 12/1982 | Gailey et al. | |
| 4,471,593 A | 9/1984 | Ragland | |
| 4,531,338 A | 7/1985 | Donatt | |
| 4,646,506 A | 3/1987 | Slapsys | |
| 4,757,663 A | 7/1988 | Kuhr | |
| 4,827,687 A * | 5/1989 | Frawley | E04B 9/10 52/473 |
| 4,984,400 A | 1/1991 | Bockmiller | |
| 5,060,426 A | 10/1991 | Jantzen | |
| 5,664,392 A * | 9/1997 | Mucha | E04B 2/96 248/262 |
| 5,881,516 A * | 3/1999 | Luedtke | E04B 1/24 52/236.3 |
| 5,956,916 A * | 9/1999 | Liss | E04B 5/10 52/281 |
| 6,023,902 A | 2/2000 | So | |
| 6,256,958 B1 * | 7/2001 | Matthews | E04B 5/10 52/274 |
| 6,301,854 B1 * | 10/2001 | Daudet | E04B 5/10 52/262 |
| 6,910,306 B2 | 6/2005 | Waalkes | |
| 8,365,481 B2 | 2/2013 | Scully et al. | |
| 2002/0062617 A1 * | 5/2002 | diGirolamo | E04B 2/767 52/688 |
| 2002/0078645 A1 * | 6/2002 | Meyer | E04B 1/24 52/289 |
| 2004/0200172 A1 * | 10/2004 | Beck | E04B 1/24 52/506.03 |
| 2006/0016139 A1 * | 1/2006 | Beck | E04B 1/24 52/289 |
| 2006/0048470 A1 * | 3/2006 | Edmondson | E04B 1/24 52/274 |
| 2006/0101744 A1 * | 5/2006 | Falbaum | E04B 9/003 52/238.1 |
| 2006/0150548 A1 * | 7/2006 | Bodnar | E04B 5/10 52/262 |
| 2007/0261805 A1 * | 11/2007 | Huang | E04B 2/7457 160/371 |
| 2009/0013639 A1 | 1/2009 | Tremblay | |
| 2009/0283359 A1 * | 11/2009 | Ravnaas | E04B 1/82 181/286 |
| 2010/0037551 A1 * | 2/2010 | Bodnar | E04B 5/04 52/634 |
| 2010/0058700 A1 * | 3/2010 | LeBlang | E04B 1/165 52/506.05 |
| 2010/0170173 A1 * | 7/2010 | Boyer | E04B 1/14178 52/235 |
| 2011/0219720 A1 * | 9/2011 | Strickland | E04B 1/24 52/655.1 |
| 2014/0013684 A1 * | 1/2014 | Kelly | E04B 1/08 52/235 |

FOREIGN PATENT DOCUMENTS

| | | |
|---|---|---|
| EP | 1720227 Y | 11/2006 |
| EP | 1746697 A | 1/2007 |
| FR | 2424986 Y | 11/1979 |
| GB | 2112492 | 7/1983 |
| GB | 2112492 A | 7/1983 |
| GB | 2273824 A | 6/1994 |
| JP | 5724754 U | 2/1982 |
| WO | 2006096997 A1 | 9/2006 |
| WO | WO 2006096997 | 9/2006 |
| WO | WO 2009073914 | 6/2009 |

* cited by examiner

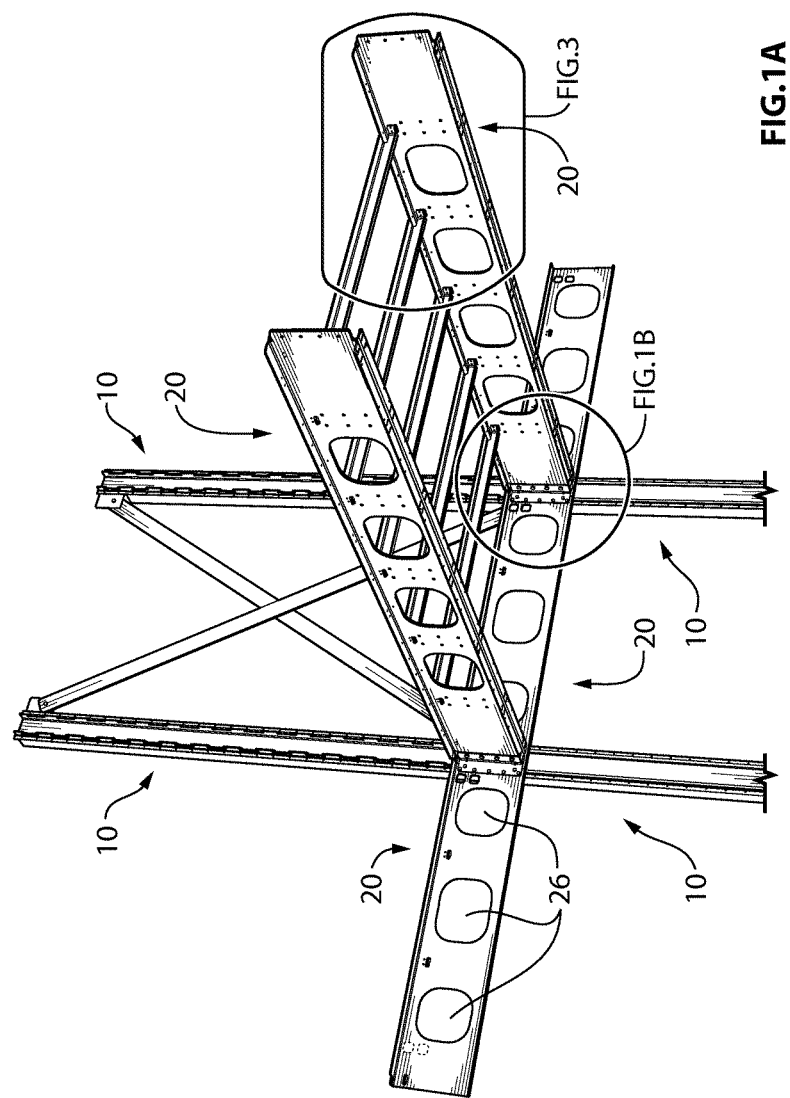

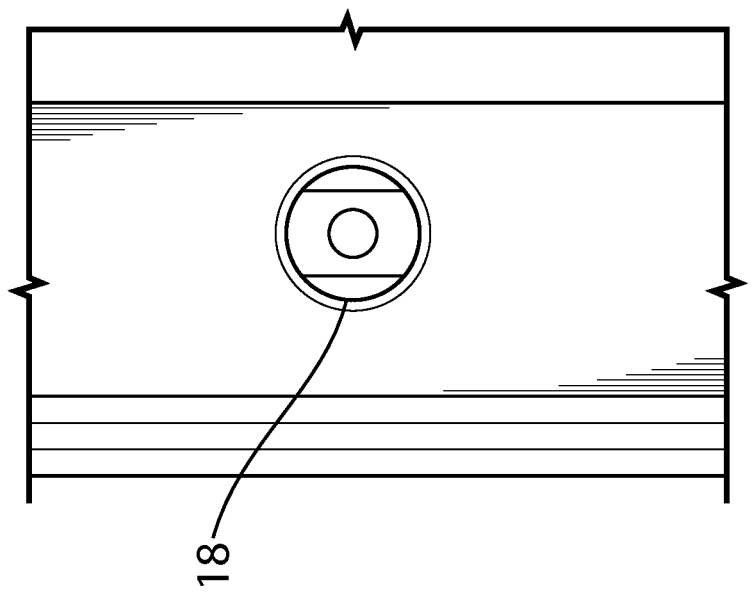

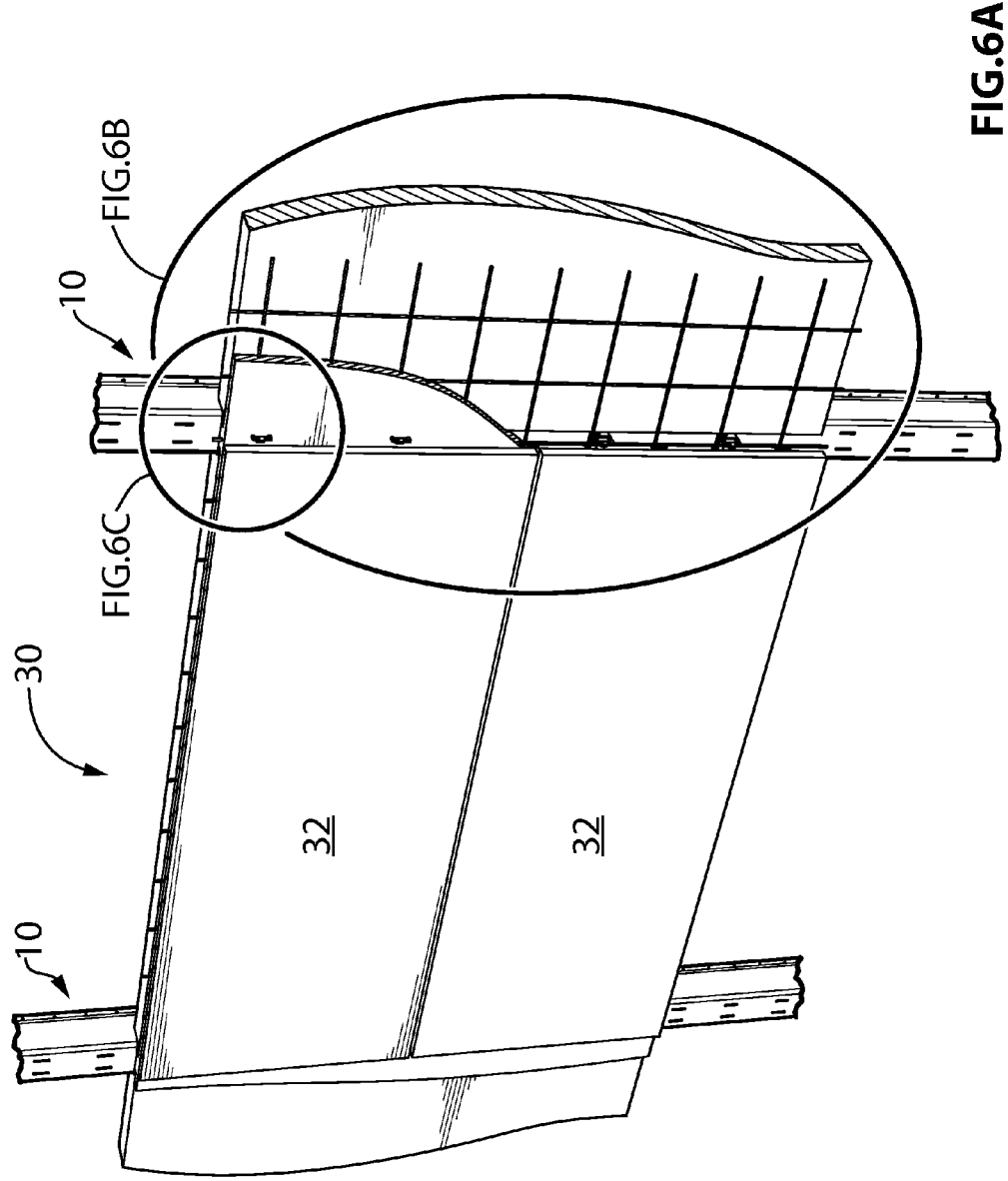

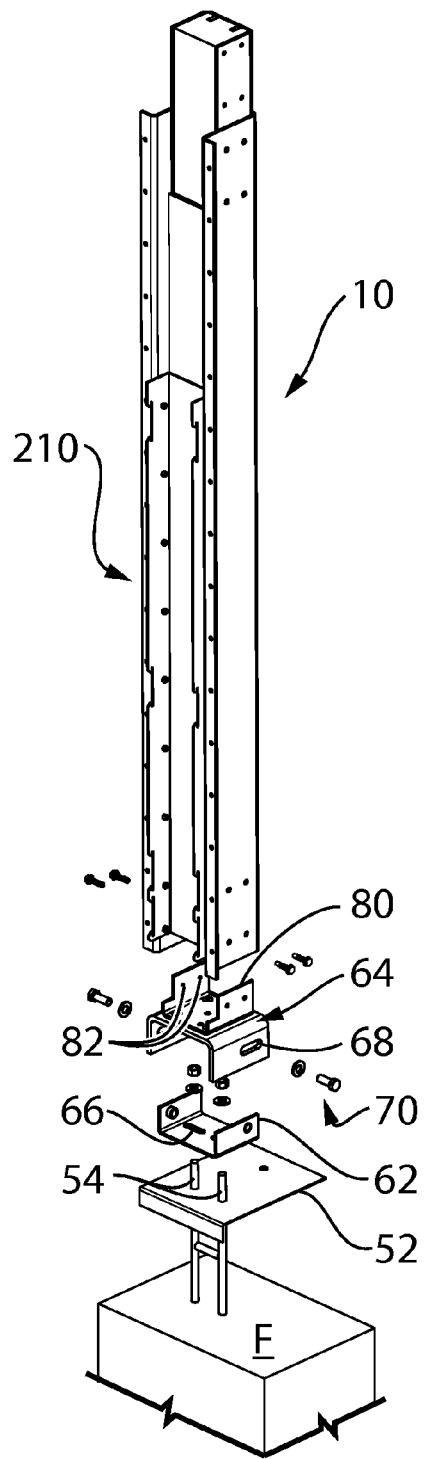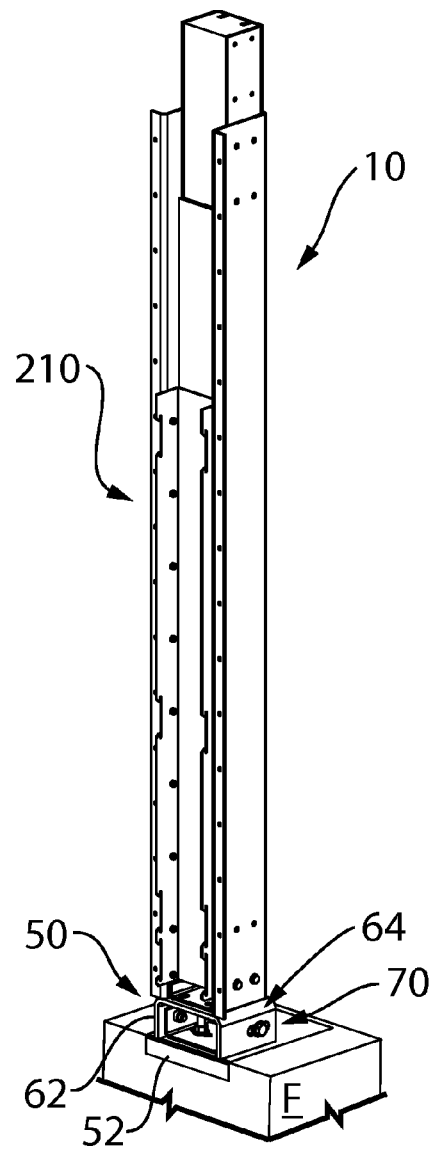
FIG.8A
FIG.8B

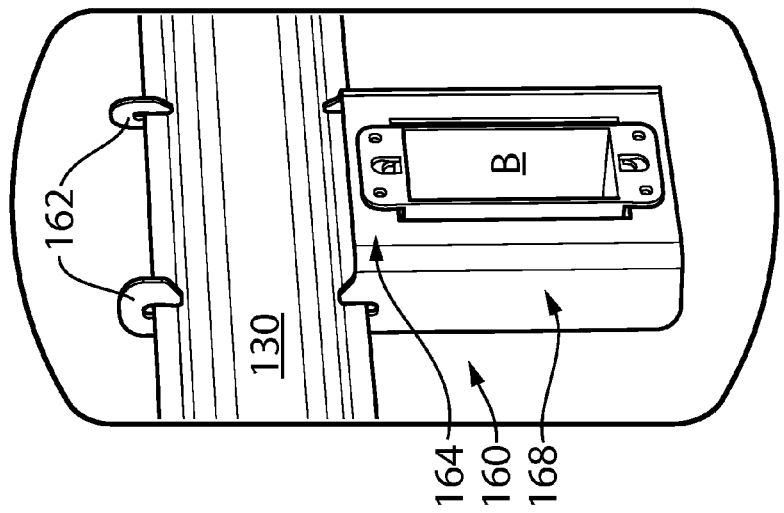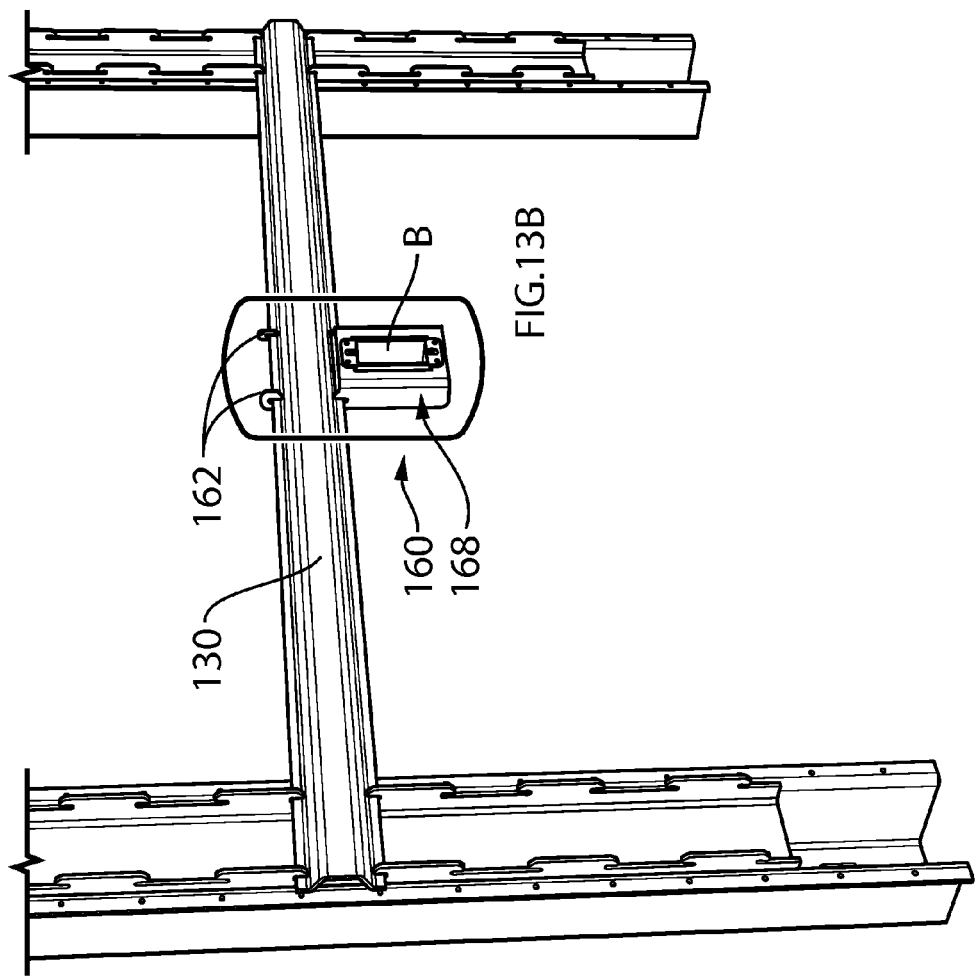

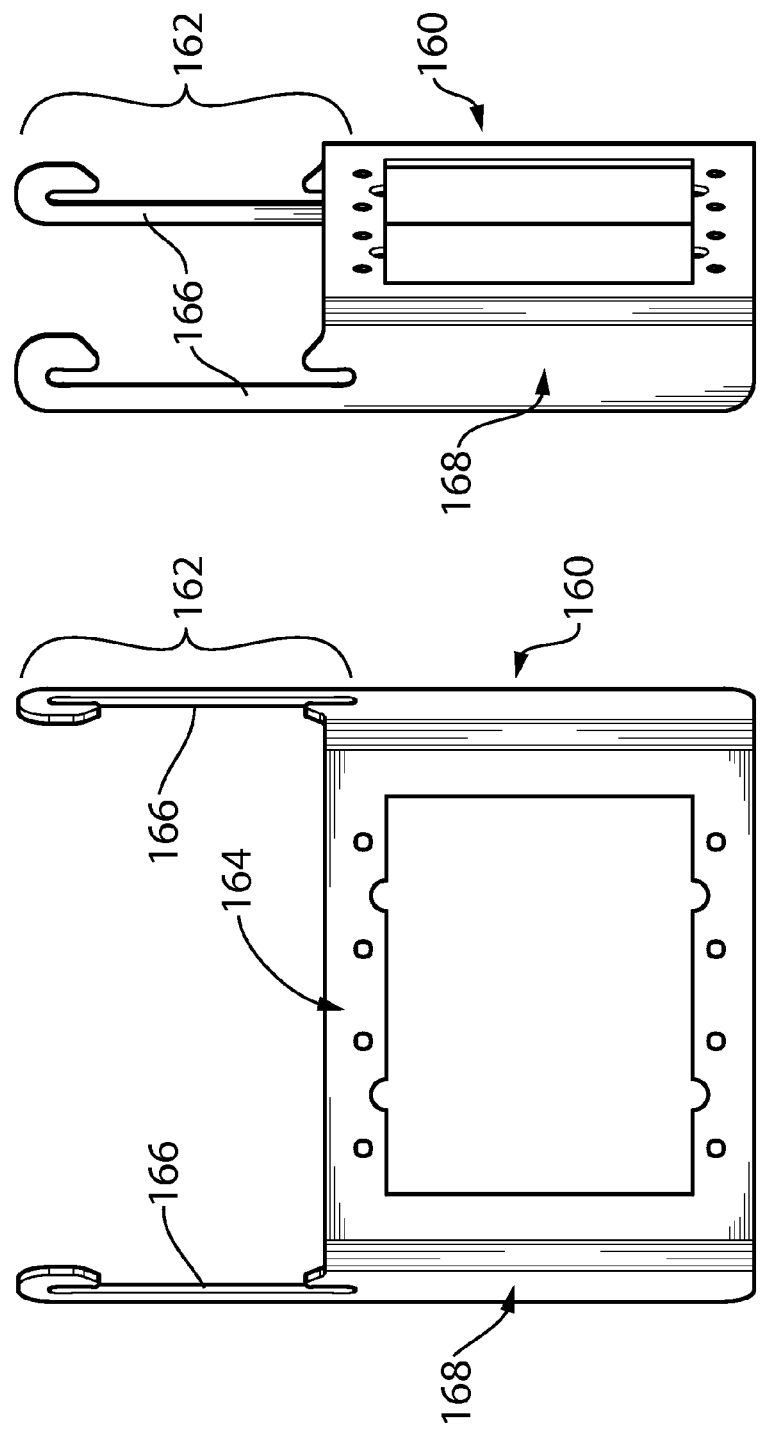

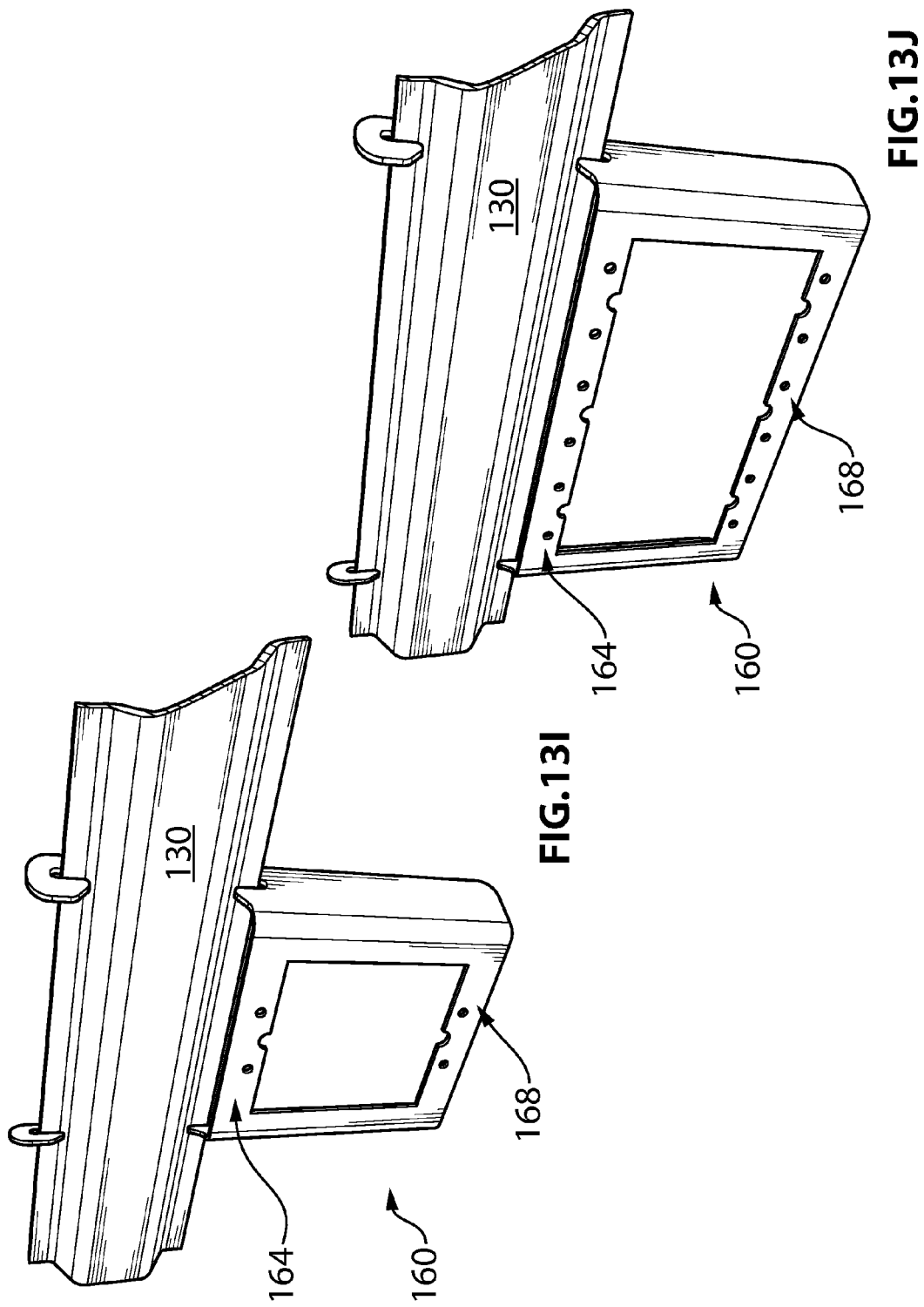

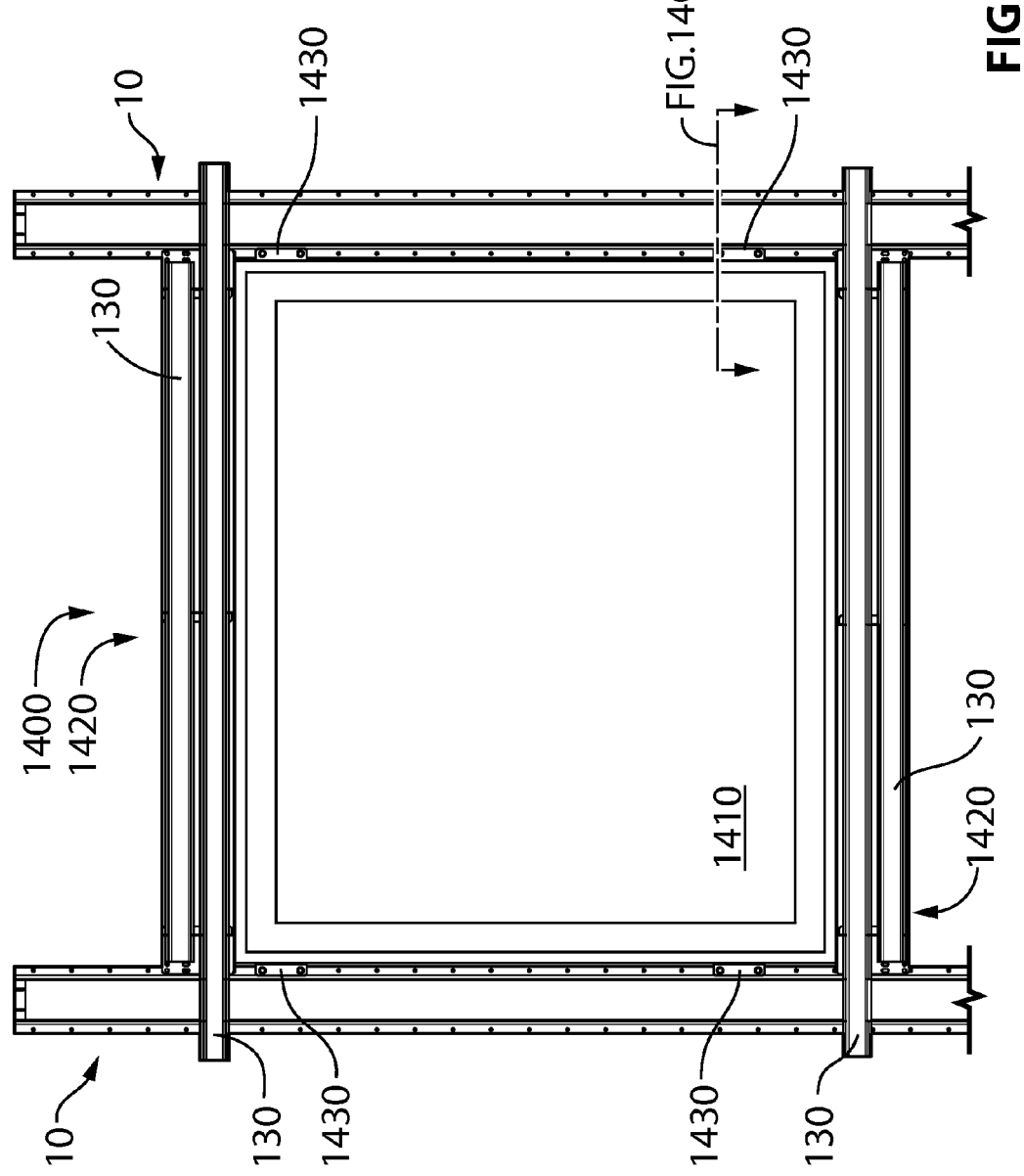

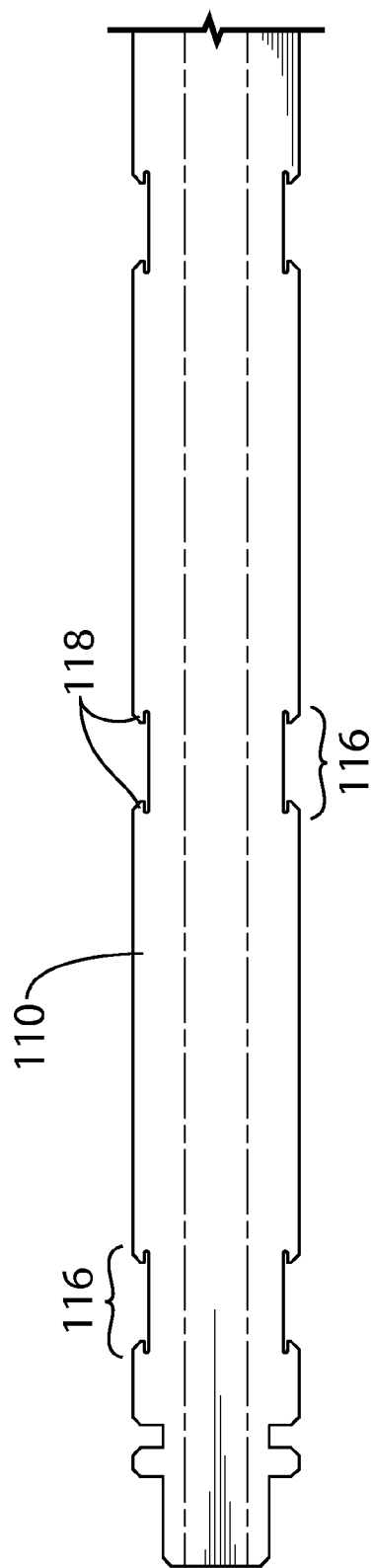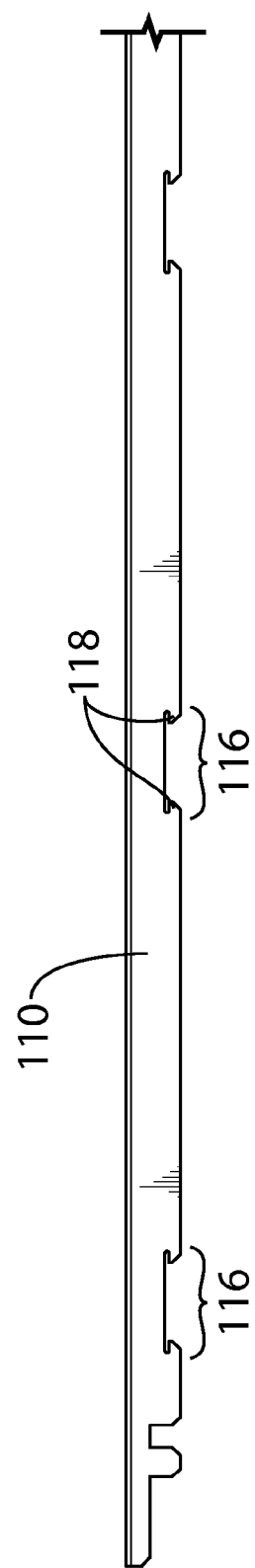

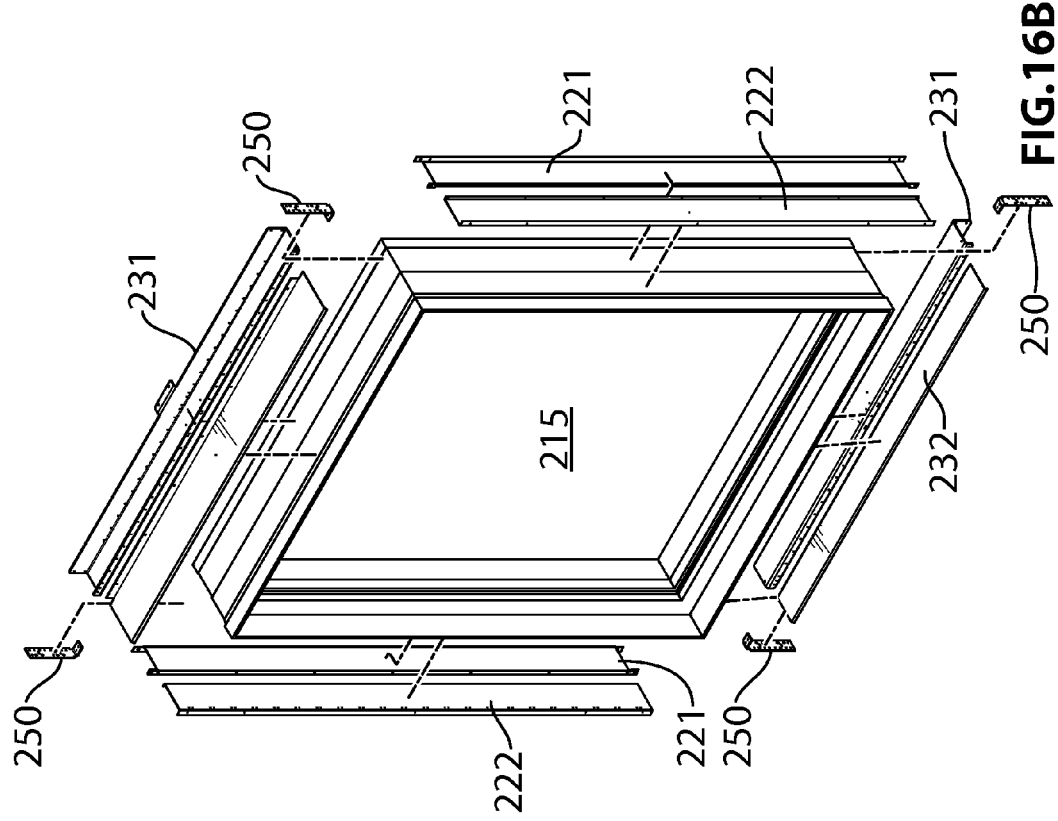
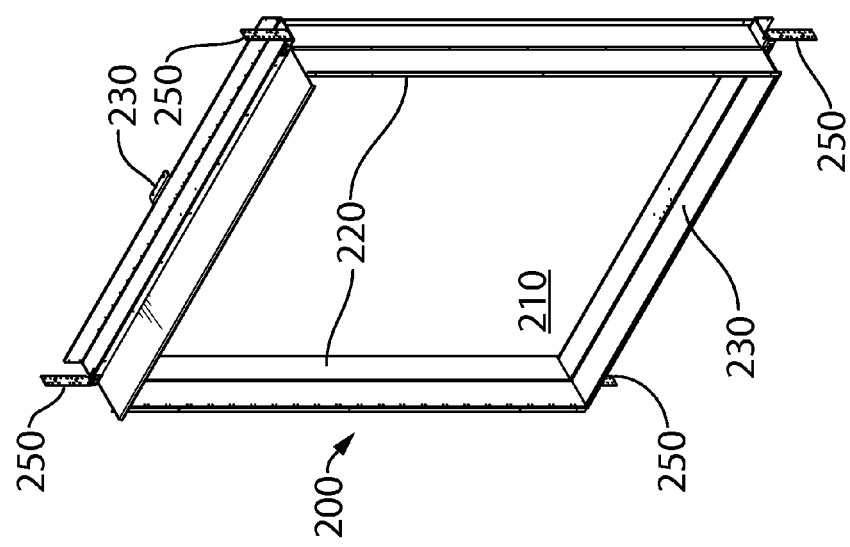
FIG.16B
FIG.16A

MODULAR BUILDING STRUCTURES IMPROVEMENTS

CROSS-REFERENCE TO RELATED APPLICATIONS

This application is filed under 37 CFR 1.53(b) as a continuation-in-part application of U.S. patent application Ser. No. 13/696,458 filed as a national phase entry of international application no. PCT/CA2011/000532 filed May 6, 2011, which claim priority from and the benefit of U.S. Provisional Application No. 61/331,897 filed May 6, 2010, the specifications of which are hereby incorporated by reference in their entirety.

BACKGROUND (a) Field

The subject matter disclosed generally relates to the field of construction work, and more specifically to modular building structures.

(b) Related Prior Art

There are many types of building structures kits. These building structures usually take the form of a kit including components that may be assembled together at a construction site. However, such kits typically have only a limited number of parts and therefore only serve to assemble buildings according to a few simple blueprints. Furthermore, many currently existing kits have only limited structural rigidity so that the buildings that are assembled using these kits are typically relatively simple buildings, such as sheds.

In cases where a kit is used to assemble a building, the builders have to resort to use traditional measurements techniques to assemble the kit components, with all associated risks of errors, and delays because of the measurement procedures.

Moreover, in cases where a kit is used to assemble a building, these kits must be complemented with additional parts to fully finish the building. Therefore, advantages brought by a kit are mitigated by the fact that some traditional construction techniques typically have to be used. These construction techniques often require cutting pieces of wood and of other materials on a construction site. Therefore, there is a need to take measurements, with all associated risks of errors, and to cut a piece of material, which often leads to unusable relatively small remaining pieces of material that are thrown away. These traditional construction techniques are therefore relatively time consuming and generate relatively large quantities of wastes.

Also, in current modular buildings assembled using a kit, the building is generally assembled, and there is no possibility to demount the structure and reassemble the structure into the original configuration, or in another configuration since some elements of the original kit had to be destroyed during the disassembly process.

Furthermore, in currently existing buildings, whether assembled using a kit or using traditional construction techniques, there are typically many thermal bridges between an interior of the building and an exterior of the building. These thermal bridges occur because insulation is typically inserted between an internal wall and an external wall of the building. These internal and external walls are typically attached to studs. Therefore, no insulation is provided at the location where these studs are found and heat may then be transferred between inside and outside the building through these studs. The thermal bridges typically cause relatively large heat losses during winter and heat admission into the building during summer.

Therefore, there exists a need in the industry to provide new and improved building structures.

SUMMARY

An object of the present invention is therefore to provide improved modular building structures.

The term "modular" is intended to mean that the building structures of the present invention are constructed from assembly of prefabricated pieces that are demountable and reassemblable. The modular building structures of the present invention can be easily modified to suit the needs of a family through its evolution or for new owners. Windows, doors and inside walls among others can be moved around in the building structure. In the extreme scenario, the entire modular building structure can be demounted, moved and reassembled elsewhere in a different or same configuration. The structures of the present invention may be preassembled from such prefabricated pieces in order to construct modules that may be used in the construction of a building structure.

In a first embodiment there is disclosed a measurement free system for building a demountable and reassemblable building structure comprising:

assembling into a building structure of a first configuration a plurality of prefabricated building components comprising a plurality of posts and joists, having a plurality of regularly spaced apart attachment receiving elements with a plurality of removable attachments engaged into the regularly spaced apart attachment receiving elements, the attachments demountably joining the plurality of posts and joists, wherein regular positioning of the regularly spaced apart attachment receiving elements provides for a measurement free assembly and wherein the building structure is partly or completely demountable and reassemblable in the first configuration or a different configuration.

The joist may comprise at least one elongated joist sections, to be connected together to form the joist beam.

The joist may further comprise at least one securing member to join the at least two elongated joist sections together to form the joist.

The posts and joists may each further comprise at least one aperture to receive plumbing wiring, heating, ventilation, air conditioning (HVAC) ducting, and/or central vacuum ducting.

In a further embodiment there is disclosed a kit for building a demountable and reassemblable building structure, the kit comprising:

an exterior wall panel defining an interior and an exterior of the structure comprising a first exterior wall panel attachment and a second exterior wall panel attachment;

at least two substantially elongated posts, each of the post comprising at least one attachment receiving element for receiving a respective one of the first and second exterior wall panel attachment so that when the first and second wall panel attachments are received by the attachment receiving elements, the wall panel is spaced from the at least two posts defining a space between the panel and each of the posts; and an insulation adapted to be engaged between each of the posts, adjacent the wall panel, wherein the space substantially reduces a thermal bridge effect between the interior and the exterior of the structure and wherein the building structure is adapted to be partly or completely demounted and reassembled in a first configuration or a different configuration.

The insulation may be chosen from an insulation panel, an insulation fibre, an insulation foam, a sprayed insulation foam, mineral wool, cellulose or combinations thereof.

The insulation panel may further comprise a lip projecting over each of the post.

The first and second wall panel attachment may each further comprise a securing element to secure the insulating panel in place.

The securing element may be at least one tongue.

In a further embodiment there is disclosed a demountable exterior wall panel attachment comprising:

a first demountable attachment member, to be received in a compatible attachment receiving element;

a second demountable attachment member, to receive a compatible exterior wall panel; and a spacer, connecting the first and second attachment member.

The spacer may further comprise a securing element.

The securing element may be at least one tongue.

In a further embodiment there is disclosed a post anchor adjustable along the three dimensional axes comprising:

a base member to be embedded into a building foundation and having a mounting member thereon, the mounting member being adjustable along a first axis; and a retaining member having
 a seat, mountable on the mounting member and being adjustable along a second axis, and
 a crown, to receive a post and being adjustable along a third axis, wherein the post anchor is adjustable along the three dimensional axes to correctly align the post anchor to the foundation and level a post to be attached thereto.

The mounting member may comprise a first adjustment member, the first adjustment member allowing adjustment of the seat along the first axis.

The mounting member may comprise at least one threaded rod.

The mounting member may consist of two threaded rods.

The mounting member may comprise a mounting joint.

The mounting joint may be a dovetail joint.

The first adjustment member may comprise a threaded nut inserted on the threaded rod.

The seat may comprise a second adjustment member, the second adjustment member allowing adjustment of the seat along the second axis.

The second adjustment member may comprise at least one aperture.

The second adjustment member may comprise two apertures.

The at least one aperture may be at least one of a substantially circular, oval, elliptical, and rectangular apertures.

The second adjustment member may be adapted to receive a securing member.

The crown may comprise a third adjustment member, the third adjustment member allowing adjustment of the crown along the third axis.

The third adjustment member may comprise at least one aperture.

The at least one aperture may be at least one of a substantially circular, oval, elliptical, and rectangular aperture.

The third adjustment member may be to receive at least one securing member, the at least one securing member securing the crown to the seat.

The at least one securing member may be a threaded bolt and a threaded nut.

The crown may comprise a post receiving member.

The post receiving member may comprise a fastener receiving element.

The post receiving member may comprise a bracket.

The post anchor may be anchored to the building foundation by being embedded, by mechanical anchoring and/or by adhesive anchoring into said foundation.

In a further embodiment there is disclosed a kit for a demountable floor anchor system comprising:

at least two joists, each of the joist comprising at least one bridge element located at a predetermined position along the joist; and at least one secondary joist comprising at each end a lug to be received in the bridge element, wherein when the secondary joist is inserted into each of at least two joists, the secondary joist is substantially perpendicular to the at least two joists, and forms a planar surface to receive a flooring surface, and wherein the demountable floor anchor system can be partly or completely demounted and reassembled in a first configuration or a different configuration.

The joist may comprise two or more bridge elements.

The two or more bridge elements may be spaced apart at fixed regular interval.

The lug may further comprise a fastener receiving element.

The joist may comprise at least one fastener receiving element.

The joist may comprise a plurality of fastener receiving elements.

The secondary joist may comprise at least one fastener receiving element.

The secondary joist may comprise a plurality of fastener receiving elements.

The fastener receiving elements may be spaced apart at fixed regular intervals.

The joist may comprise at least two joist sections to be connected together to form the joist.

The joist may further comprise at least one securing member, to join the at least two joist sections together to form the joist.

The beam may further comprise at least one aperture to receive plumbing, wiring, heating, ventilation, air conditioning (HVAC) ducting, and/or central vacuum ducting.

In a further embodiment there is disclosed a method of assembling a demountable and reassemblable floor structure comprising:

a) assembling a plurality of prefabricated floor components comprising a plurality of joists, and a plurality of secondary joists as described above into a demountable floor structure by placing the plurality of joists parallel to each other, and inserting the lug provided at each end of the secondary joist into each facing bridge element, wherein the joists and the secondary joists are substantially perpendicular to each other and form a planar surface to receive a flooring surface and wherein the floor structure is partly or completely demountable and reassemblable in the first configuration or a different configuration.

The method may further comprise a step b) after step a):
b) fastening the plurality of secondary joists to the plurality of joists.

The method may further comprise a step c) after step b):
c) overlaying a flooring surface on the demountable floor structure.

In a further embodiment there is disclosed a method of assembling a demountable floor comprising:

a) forming a planar surface to receive a plurality of flooring tiles by assembling prefabricated floor components comprising a plurality of joists, and a plurality of secondary joists as described above, and a plurality of flooring tiles; into a demountable floor structure by placing the plurality of joists parallel to each other, and inserting the lug provided at each end of the secondary joist into each facing bridge element, and b) overlaying the plurality of flooring tiles over the demountable floor structure, wherein the joists and the secondary joists are substantially perpendicular to each other and form a planar surface to receive a plurality of flooring tiles and wherein the floor structure can be partly or completely demounted and reassembled in a first configuration or a different configuration.

The method may further comprise a step i) after step b):

i) fastening the plurality of secondary joists to the plurality of joists prior to or after overlaying of the flooring tiles.

In a further embodiment there is disclosed a demountable furring strip support comprising:
  a demountable furring strip gripping member comprising at least one of
    a spacer, and
    a first and second hook member connected at opposite ends of the spacer; and
  a demountable attachment member, to be received in a compatible attachment receiving element and connected to the demountable furring strip gripping member.

The furring strip support may be integral.

In a further embodiment there is disclosed a kit for a demountable and reassemblable wall support system comprising:
  at least one furring strip; and
  at least two furring strip supports as defined above.

In a further embodiment there is disclosed a kit for a demountable and reassemblable wall comprising:
  a wall panel defining an interior and an exterior,
  at least one furring strip,
  at least two furring strip support as defined above; and
  at least two substantially elongated posts, each of the posts comprising at least one attachment receiving element for receiving a furring strip support so that when the at least one furring strip is received by the at least two furring strip support, the wall panel is spaced from the at least two substantially elongated posts defining a space between the panel and each of the substantially elongated posts; and
  wherein the space substantially reduces a thermal bridge effect between the interior and the exterior demountable wall and wherein the wall can be partly or completely demounted and reassembled in a first configuration or a different configuration.

The kit may further comprise an insulation element adapted to be engaged between each of the post, adjacent the wall panel.

The insulation element may be at least one of an insulation panel, an insulation fibre, and an insulation foam.

The furring strip may be made of a sound dampening material.

In a further embodiment there is disclosed a demountable furring strip support comprising:
  at least one elongated planar member comprising
    at least one furring strip gripping member having a first and second hook member to secure a furring strip; and
    a plurality of regularly spaced apart attachment receiving elements to receive compatible attachments.

The demountable furring strip support may comprise two elongated planar member connected by a spacer member.

The demountable furring strip support may be U-shaped.

The furring strip support may be integral.

In a further embodiment there is disclosed a kit for a demountable and reassemblable wall support system comprising:
  at least one furring strip; and
  at least two furring strip supports described above.

In a further embodiment there is disclosed kit for a demountable and reassemblable wall comprising:
  a wall panel defining an interior and an exterior,
  at least one furring strip,
  at least two furring strip support described above; and
  at least two substantially elongated posts, each of the posts comprising at least one attachment receiving element for receiving a demountable furring strip support so that when the at least one furring strip is received by the at least two furring strip support, the wall panel is spaced from the at least two substantially elongated posts defining a space between the panel and each of the substantially elongated posts; and
  wherein the space substantially reduces a thermal bridge effect between the interior and the exterior demountable wall and wherein the wall can be partly or completely demounted and reassembled in a first configuration or a different configuration.

The kit may further comprise an insulation element adapted to be engaged between each of the post, adjacent to the wall panel.

The insulation element may be at least one of an insulation panel, an insulation fibre, and an insulation foam.

The furring strip may be made of a sound dampening material.

In a further embodiment there is disclosed a demountable electrical junction box support comprising:
  a demountable furring strip gripping member comprising at least one of
    a spacer, and
    a first and second hook member connected at opposite ends of the spacer; and
  a housing, connected to the demountable furring strip gripping member, the housing comprising an aperture to receive at least one electrical junction box.

The demountable electrical junction box support may be integral.

The demountable electrical junction box support may further comprise at least one electrical box therein.

In a further embodiment there is disclosed a kit for a demountable and reassemblable frame comprising:
  a frame assembly having an interior and an exterior surface comprising
    at least two frame assembly attachments facing the interior surface to secure the frame assembly to a respective first and second substantially parallel post,
    the post having a plurality of regularly spaced apart attachment receiving elements to receive the frame assembly attachments;
  a first and second furring strip receiving bar comprising
    at least one furring strip gripping member to receive at least one furring strip;
    the furring strip receiving bar adapted to be secured substantially perpendicular to the first and second substantially parallel posts to form a border around the frame assembly.

The furring strip gripping member may comprise a first and second hook member to secure a furring strip.

The furring strip receiving bar may be adapted to receive two furring strips.

The frame assembly may be a window assembly or a door assembly.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

FIG. 1A illustrates a view of a building structure according to one embodiment of the present invention.

FIG. 4 illustrates a side view of a substantially elongated post according to one embodiment of the present invention.

FIG. 6A illustrates side perspective views of a wall structure according to one embodiment of the present invention.

FIG. 8A illustrates a perspective view of a post anchor according to one embodiment of the present invention.

FIG. 8B illustrates a perspective view of a post anchor according to one embodiment of the present invention.

FIG. 13A illustrates a perspective view of an electrical junction box support according to an embodiment of the present invention.

FIG. 13B illustrates a perspective view of an electrical junction box support according to an embodiment of the present invention.

FIG. 13C illustrates a top view of a electrical junction box support according to an embodiment of the present invention.

FIG. 13D illustrates a perspective view of an electrical junction box support according to an embodiment of the present invention.

FIG. 13E illustrates a front view of an electrical junction box support according to an embodiment of the present invention.

FIG. 13I illustrates a front perspective view of an electrical junction box support according to an embodiment of the present invention.

FIG. 13J illustrates a front perspective view of an electrical junction box support according to an embodiment of the present invention.

FIG. 14A illustrates a front view of a frame structure according to an embodiment of the present invention.

FIG. 15C illustrated a flat pattern view of a ceiling furring strip receiving elements according an embodiment of the present invention.

FIG. 15D illustrated a side view of a ceiling furring strip receiving elements according an embodiment of the present invention.

FIG. 16A illustrated a perspective view of a frame assembly according an embodiment of the present invention.

FIG. 16B illustrated a perspective view of a frame assembly according an embodiment of the present invention.

DETAILED DESCRIPTION OF THE PREFERRED EMBODIMENTS

In embodiments there are disclosed a measurement free system for building a demountable and reassemblable building structure by assembling into a building structure of a first configuration a plurality of prefabricated building components that have a plurality of regularly spaced apart attachment receiving elements with a plurality of removable attachments engaged into the regularly spaced apart attachment receiving elements, and the attachments are demountably joining the plurality of prefabricated building components. The regular positioning of the regularly spaced apart attachment receiving elements provides for a measurement free assembly and the building structure is partly or completely demountable and reassemblable in the first configuration or a different configuration.

The various components of the kits are dimensioned so that they are readily attachable to the other components to which they are to be attached. Therefore, there is no need to cut parts, or measure parts to assemble the building structure using the kits according to the invention. However, it is within the scope of the invention to have kits similar to the kit described in this document in which some of the components need to be cut before being used.

The reader skilled in the art will readily appreciate that while kits for building a complete building structure is described in the present specification, it is within the scope of the invention to use only some of the kits to assemble part of alternative houses or other buildings. Furthermore, the kits are also usable to assemble other building structures such as, for example, sheds, barns and larger buildings, or portions thereof.

Although a specific building structure including all the above-mentioned components is described in the present document, the reader skilled in the art will readily appreciate that it is also within the scope of the invention to have kits that include only some of the components so that less complex houses may be built. Similarly, it is also within the scope of the invention to have kits that include other components that are not mentioned hereinabove.

Figure 1B:
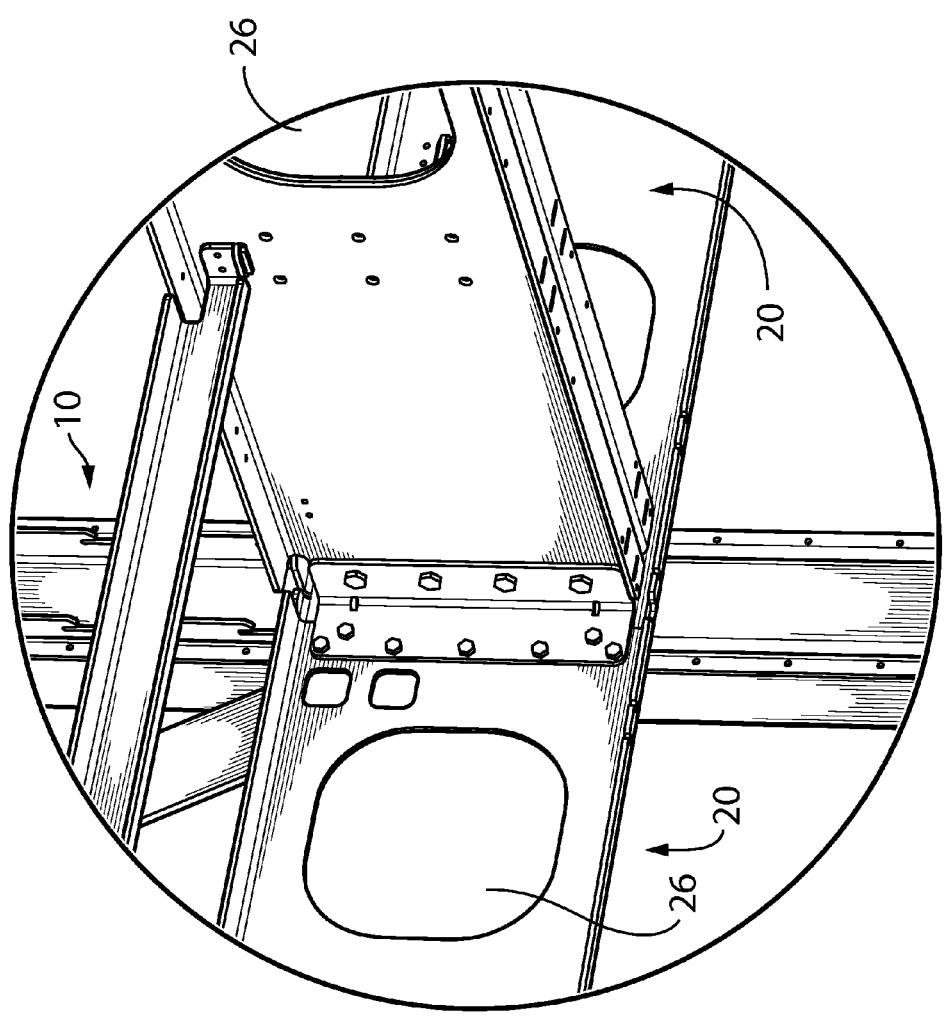
FIG. 1B illustrates a view of a building structure according to one embodiment of the present invention.
Figure 2B:
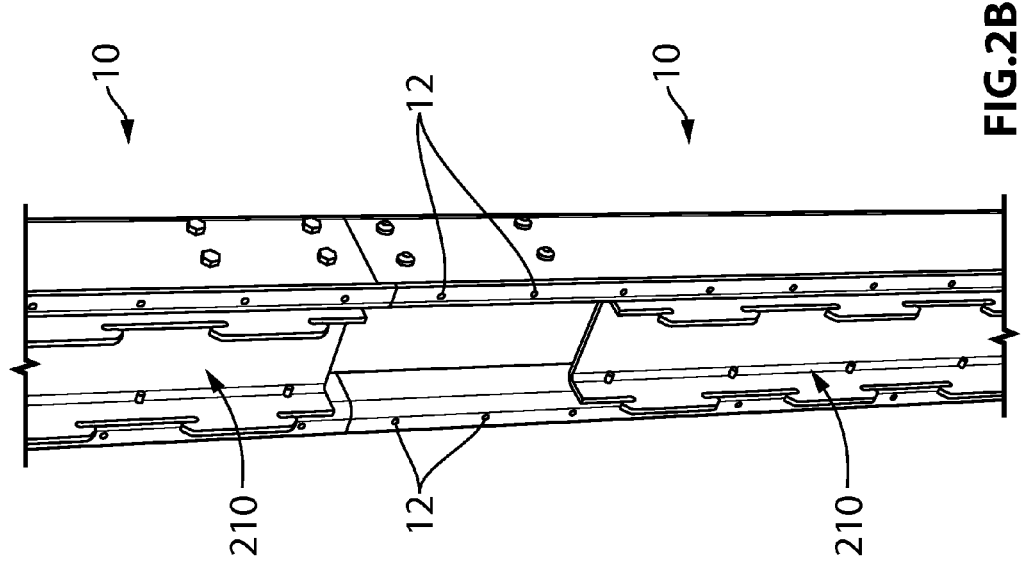
FIG. 2B illustrates perspective frontal views of a substantially elongated post according to one embodiment of the present invention.
Figure 2A:
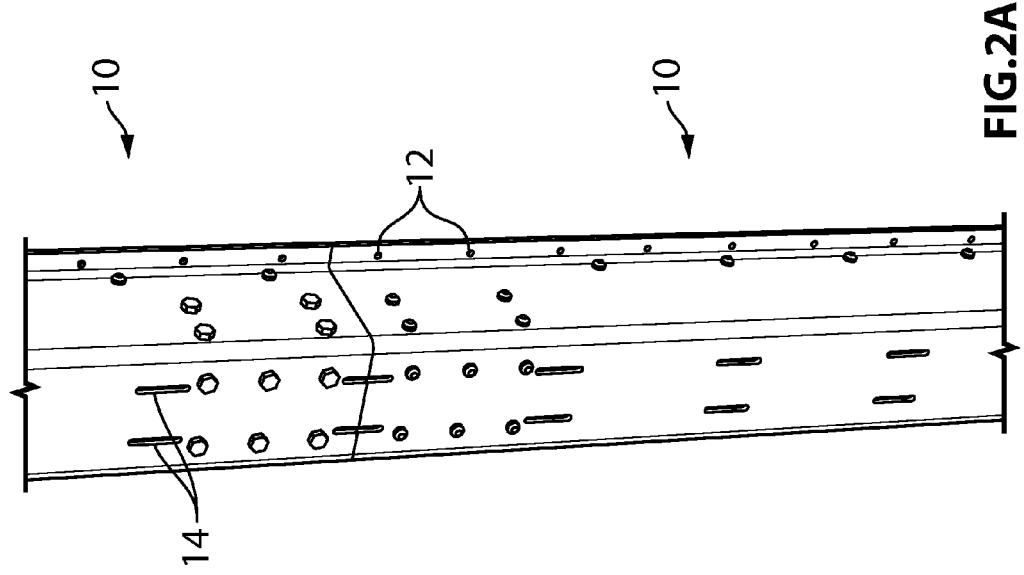
FIG. 2A illustrates perspective back view of a substantially elongated post according to one embodiment of the present invention.
Figure 3A:
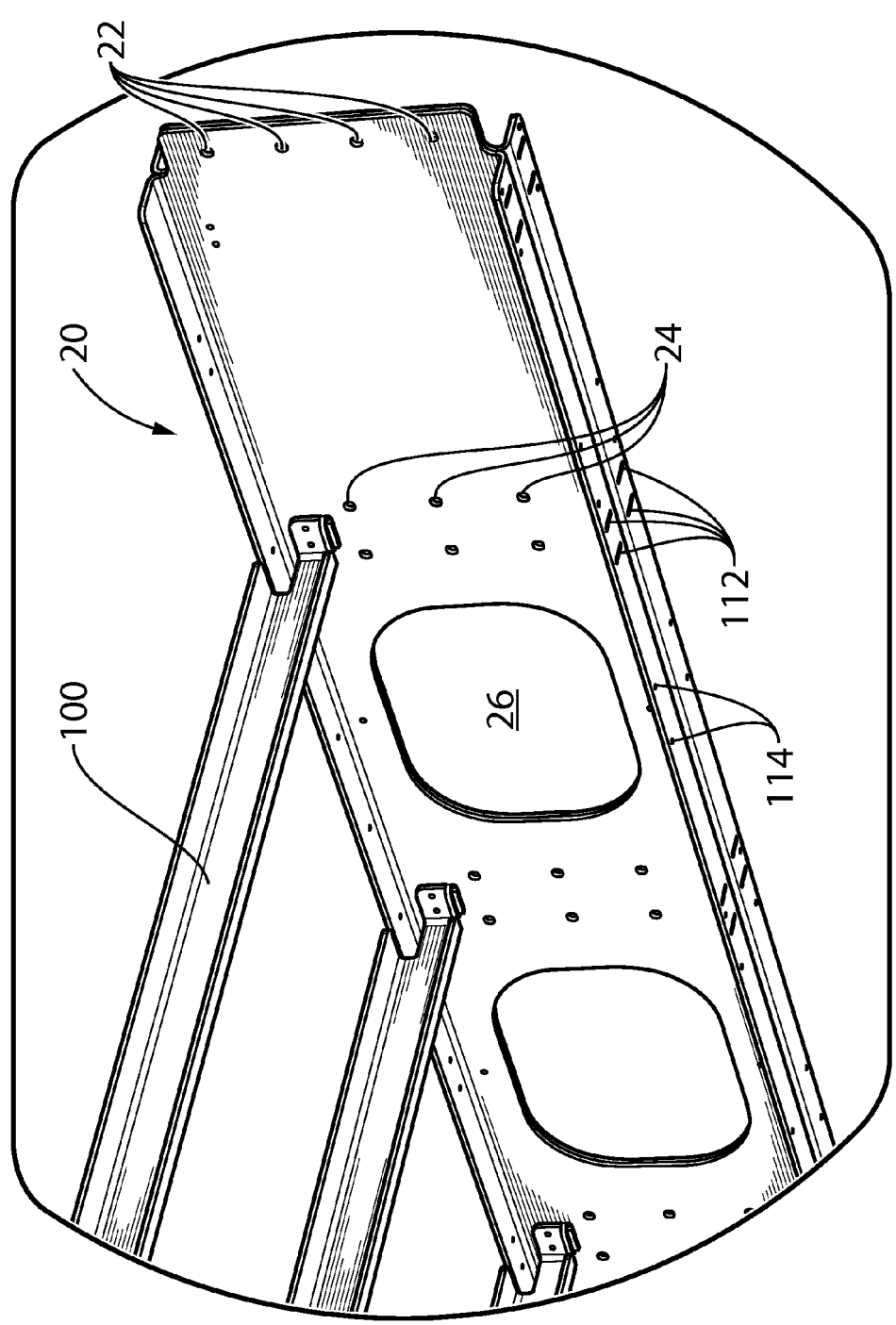
FIG. 3A illustrates perspective view of a joist or beam according to one embodiment of the present invention.
Figure 3B:
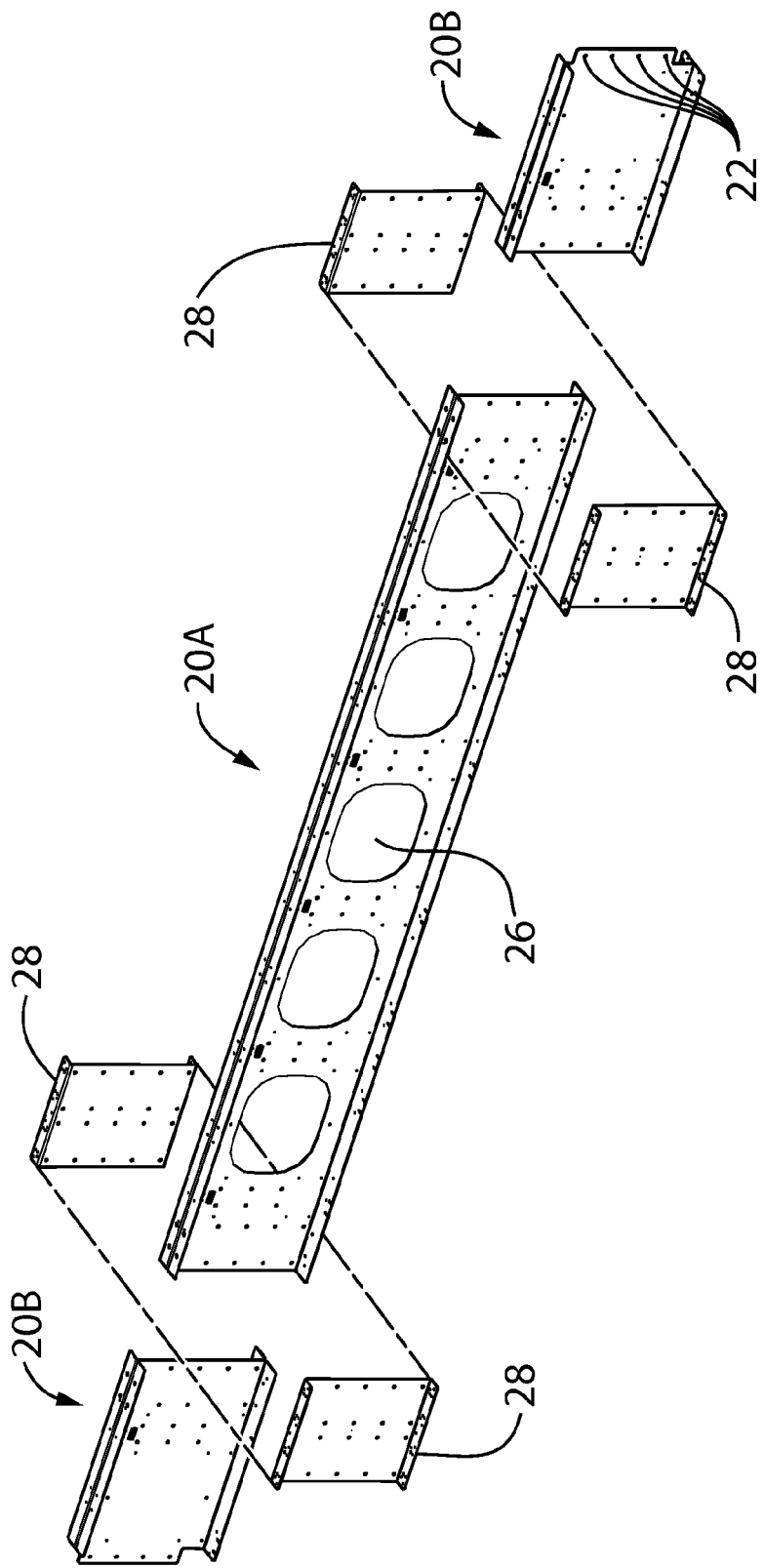
FIG. 3B illustrates perspective view of a joist or beam according to one embodiment of the present invention.
Figure 3C:
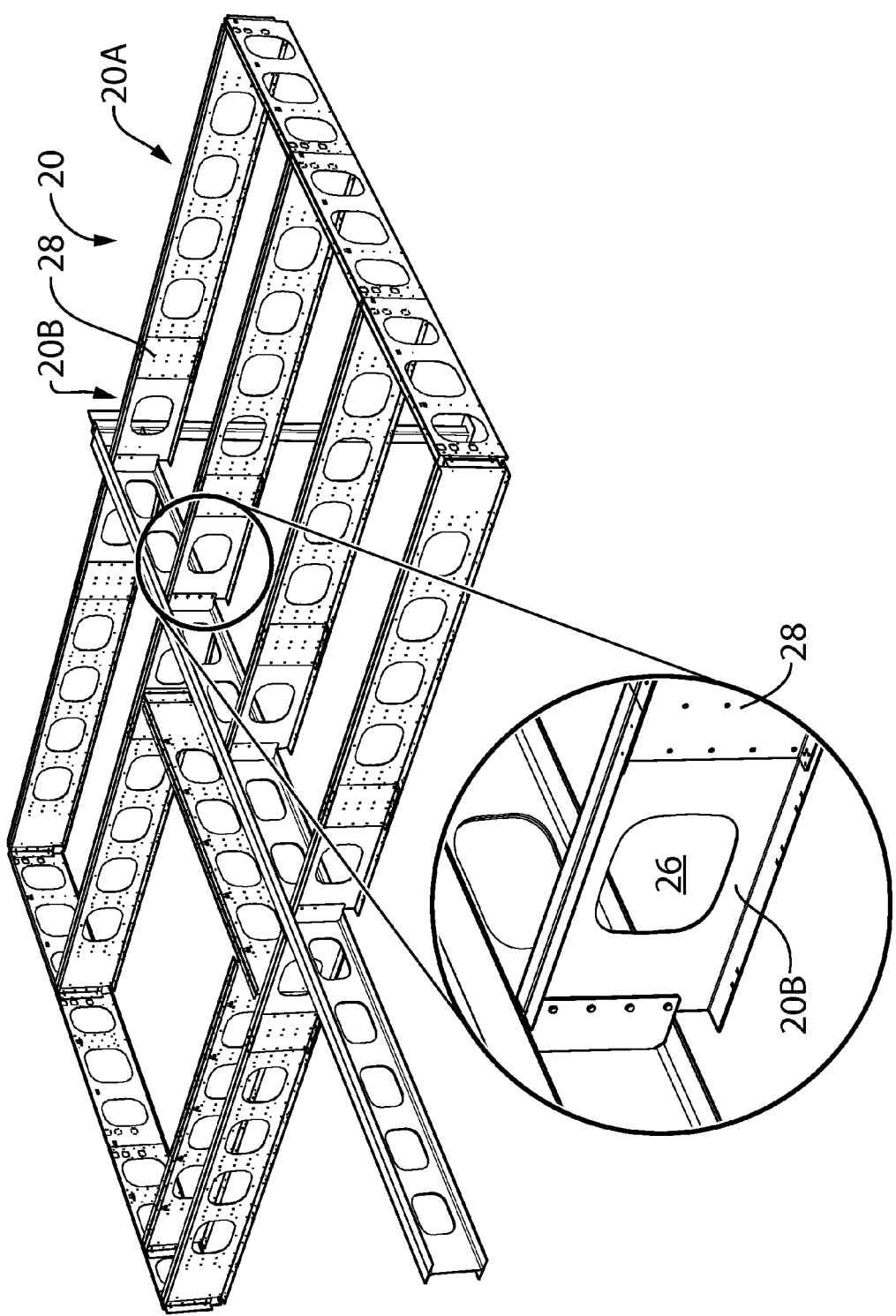
FIG. 3C illustrates perspective view of a joist or beam according to one embodiment of the present invention.

Now referring to FIGS. 1, 2 and 3. There is disclosed a measurement free system for building a demountable and reassemblable building structure by assembling into a building structure of a first configuration a plurality of prefabricated posts, and joists, such as posts 10 and joists 20.

as shown in FIGS. 1A and B. The posts 10 and joists 20 have a plurality of regularly spaced apart attachment receiving elements, such as elements 12, 14, on the posts of FIG. 2 and elements 22 and 24, on the joists shown in FIG. 3A. A plurality of removable attachments, such as post positioning member 16, combinations of bolts, rods and compatibles nuts as may be appreciated by the person skilled in the art, are engaged into the regularly spaced apart attachment receiving elements 12, 14, 22 and 24 and the attachments are demountably joining the plurality of posts 10 and joists 20. The regular positioning of the regularly spaced apart attachment receiving elements 12, 14, 22 and 24 provides for measurement free assembly and the building structure is partly or completely demountable and reassemblable in the first configuration or a different configuration.

The posts 10 and joists 20 may comprise a number of apertures 18 (see FIG. 4) and 26 (see FIG. 1) that may receive plumbing and/or wiring such as electrical wiring, optical fibre cables, or any desired cabling that may be required to be used in the structure. The apertures may also be used to received heating, ventilating, and air conditioning (HVAC) ducting, ducting for central vacuum cleaners, or any other elements that may be required to be inserted in the structure.

Now referring to FIGS. 3B and C. The building structure of the present invention includes joists 20 that are formed of at least one elongated joist section 20A and/or 20B. The elongated joist sections 20A/20B are joined at their ends by securing members 28, which may connect the elongated joist sections by insertion of fasteners in attachment receiving elements present on both structures. The use of joists 20 that are assembled from shorter elongated sections is particularly advantageous as it allows the manufacture of sections that can be handled by one or a few workers without the need for heavy lifting equipment. This is quite advantageous when assembling a housing structure in a wooded area, as trees do not need to be cut to make way for the machinery normally required for assembly of long joists. Furthermore, transportation of the section of joist does not require long and heavy machinery as the sections will fit nicely inside regular truck load.

Figure 6C:
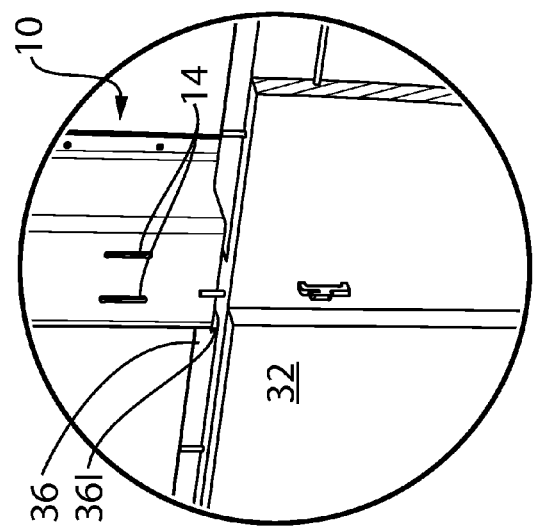
FIG. 6C illustrates side perspective views of a wall structure according to one embodiment of the present invention.
Figure 6B:
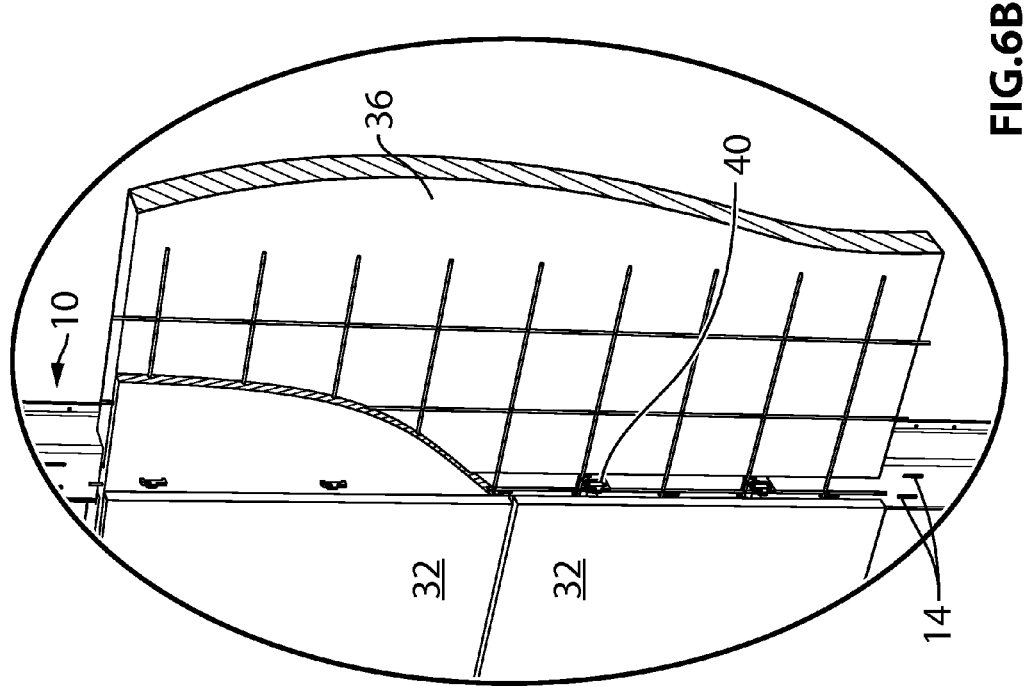
FIG. 6B illustrates side perspective views of a wall structure according to one embodiment of the present invention.

Now referring to FIG. 6. The building structure of the present invention also includes a kit for building a demountable and reassemblable wall panel structure 30 which has a wall panel 32 defining an interior and an exterior of the structure. To connect the wall panel 32 to the posts 10, attachments such as wall panel attachments 40 are used. Each of the substantially elongated posts 10 has a number of attachment receiving elements 14 to receive the wall panel attachment 40. When the wall panel attachments 40 are received by the attachment receiving elements 14, the wall panel 32 is spaced from the posts 10, such that a space is defined between the wall panel 32 and each of the posts 10. The space between the wall panel 32 and the posts 10 substantially reduces any thermal bridge effect that may occur between the interior and the exterior of the structure. The wall structure 30 may be partly or completely demounted and reassembled in a first configuration or a different configuration.

To further insulate the wall structure 30, an insulation panel 36 may be inserted between wall panel 32 and the posts 10. Other types of isolation are also contemplated, for example, mineral wool, sprayed insulation foam such as polyurethane, cellulose or any other types of insulation material. The insulation panel 36 may be frictionally engaged between each of the posts 10, adjacent the wall panel 32. The insulation panel 36 may comprise a lip 361 that is projecting over each of the post 10, further reducing any thermal bridging effect and thereby improving insulation. To prevent movement of the insulation panel 36, the wall panel attachments 40 may be provided with a securing element. The securing element may be any suitable fastener, for example a wedge or a short elongated piece that is inserted through an aperture present in one embodiment of the of wall panel attachments 40. The securing element may be built integral the wall panel attachments 40, for example as a section of the wall panel attachment 40 which is folded over and above the surface of the insulating panel 36 facing the wall panel 32, thereby preventing the insulating panel 36 from being pushed toward the wall panel 32. As shown in FIG. 6, the securing element may be a tongue 48 that may be folded over the insulating panel 36 from the wall panel attachment 40.

Figure 7:
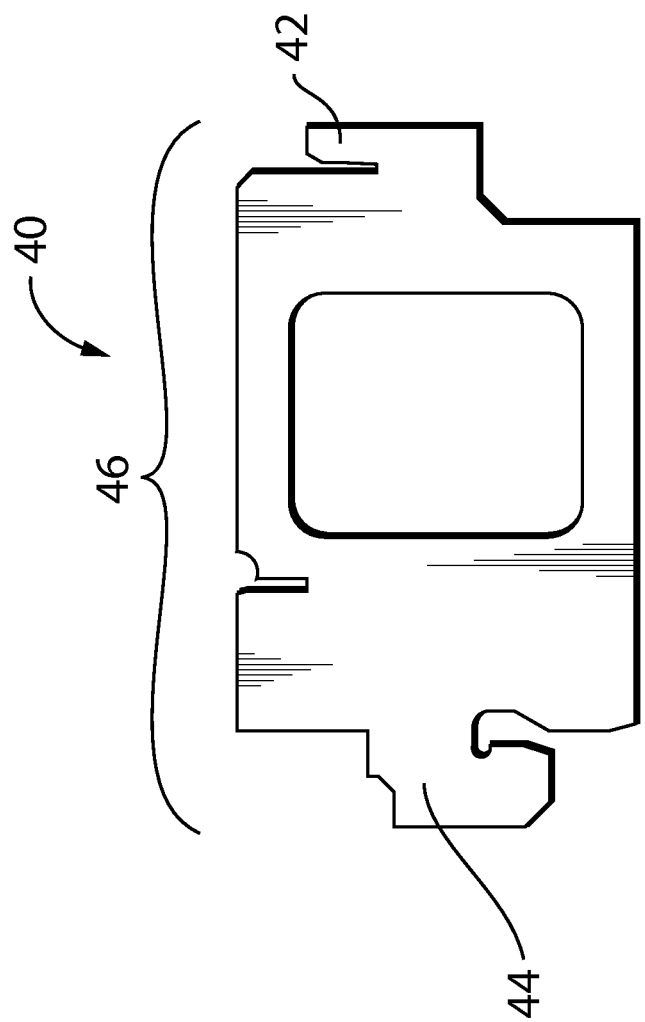
FIG. 7 illustrates a side view of a demountable wall panel attachment according to one embodiment of the present invention.

Now referring to FIG. 7, the demountable wall panel attachment 40 of the present invention comprises a first demountable attachment member 42 which may be received in a compatible attachment receiving element such as attachment receiving element 14 in posts 10. It also comprises a second demountable attachment member 44 which may receive a compatible wall panel 32; and a spacer 46 connects the attachment member 42 and 44 together. The demountable wall panel attachment 40 may comprise a securing element, such as tongue 48 shown in FIG. 7.

Figure 8C:
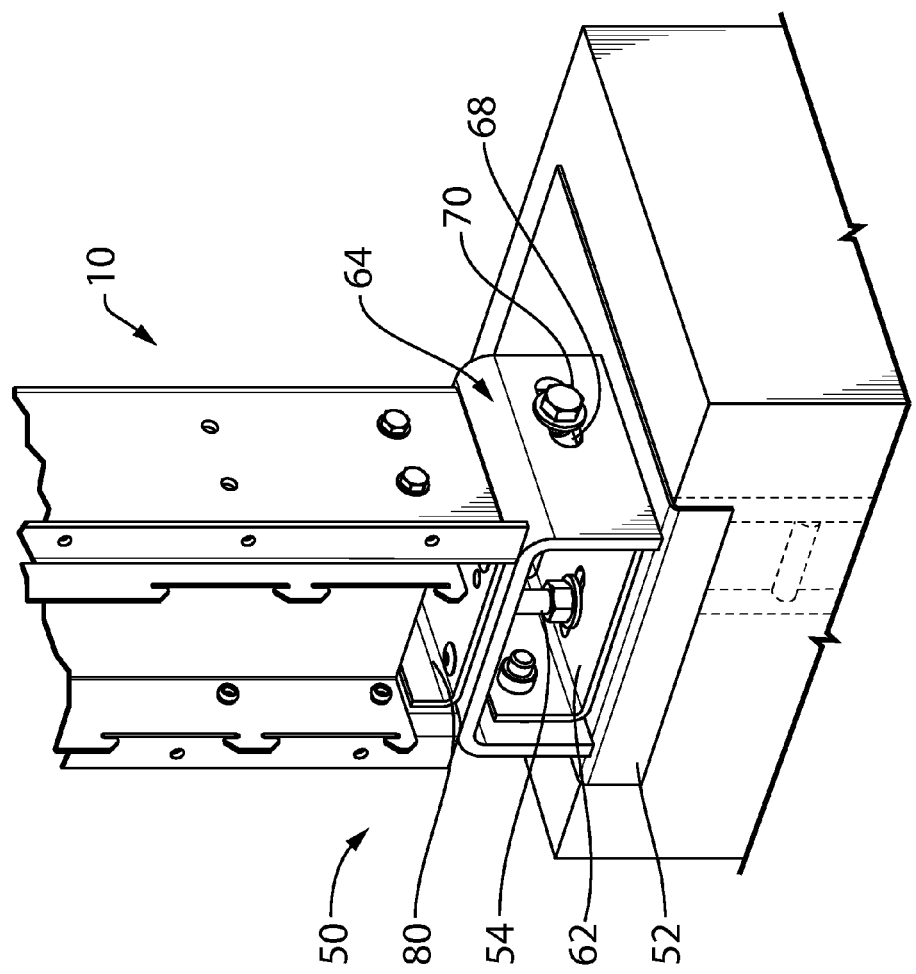
FIG. 8C illustrates a perspective view of a post anchor according to one embodiment of the present invention.

Now referring to FIG. 8. The building structure of the present invention is suitable for being built on a foundation, such as a concrete foundation. To anchor the posts 10, a post anchor may be used. A post anchor 50 of the present invention comprises a base member 52 which may be anchored into a building foundation F. The anchoring of the base member 52 may be done by embedding the base member 52 into the foundation when it is first poured. The anchoring may also be an adhesive anchor. Adhesive anchors are for example resin anchors comprising steel studs, bolts and anchorages which are bonded into a substrate, usually masonry and concrete, using a resin based adhesive system. Ideally suited for high load applications, in virtually all cases the resulting bond is stronger than the base material itself and as the system is based on chemical adhesion, no load stress is imparted to the base material as with expansion type anchors and are therefore ideal for close to edge fixing, reduced center and group anchoring and use in concrete of unknown quality or low compressive strength. The anchoring may also be a mechanical anchoring, where a mechanical anchor is inserted (e.g. into a drilled hole) into the foundation by conventional means.

The base member 52 comprises a mounting member thereon. For example, the mounting member may be a rod or the likes, with a suitable mounting joint (e.g. a dovetail joint), or threads. A retaining member 60 is disposed over the base member 52, and comprises a seat 62, which is mountable on the mounting member, and a crown 64 which may receive a post 10, and is adjustable along a third axis.

The mounting member of the anchor 50 comprises a first adjustment member in order to be adjustable along a first axis. For example, a number of threaded rods 54 are disposed on base member 52, and when seat 62 is mounted on the mounting member comprised of the threaded rods 54, the position of the seat 62 on the mounting member may be adjusted by using a suitable assembly of threaded nuts on the threaded rods 54.

The seat 62 comprises a second adjustment member which allows adjustment of the seat 62 along a second axis. For example, the seat 62 may comprise one or more apertures 66 that may receive a mounting member (e.g. threaded rods 54). The aperture 66 is suitably shaped as substantially circular, oval, elliptical, or rectangular, so as to accommodate the shape of the preferred mounting member chosen. The second adjustment member may receive the mounting member therein, while leaving a space around the mounting member, such that the seat 62 may be moved back and forth in a desired direction along the second axis to adjust the position of the seat 62 as may be required to align the post anchor 50 with the other post anchors 50 of the entire building structure.

The crown 64 of the post anchor 50 also comprises a third adjustment member allowing adjustment of the crown along a third axis. For example, the crown 64 may comprise one or more aperture 68 that may receive a securing member (e.g. threaded bolt 70, secured by a nut). The aperture 68 is suitably shaped as substantially circular, oval, elliptical, or rectangular, so as to accommodate the shape of the preferred securing member chosen. The third adjustment member may receive the securing member therein, while leaving a space around the securing member such that the crown 64 may be moved back and forth in a desired direction along the third axis to adjust the position of the crown 64 as may be required to align the post anchor 50 with the other post anchors 50 of the whole entire building structure. The three adjustment members therefore allow for the adjustment of the post anchor 50 along the three dimensional axes, thereby levelling the post 10 attached thereto.

To connect posts 10 on the post anchor 50, the crown 64 comprises a post receiving member 80. The post receiving member has one or more fastener receiving elements 82 that will align with the regularly spaced apart attachment receiving elements 12 of posts 10 so that a suitable attachment may be inserted therein to secure the post 10 on the crown 64 of the post anchor 50. As exemplified in FIG. 8, the post receiving element comprises a U-shaped bracket, but any suitably shaped bracket may be used as a post-receiving member.

Figure 9A:
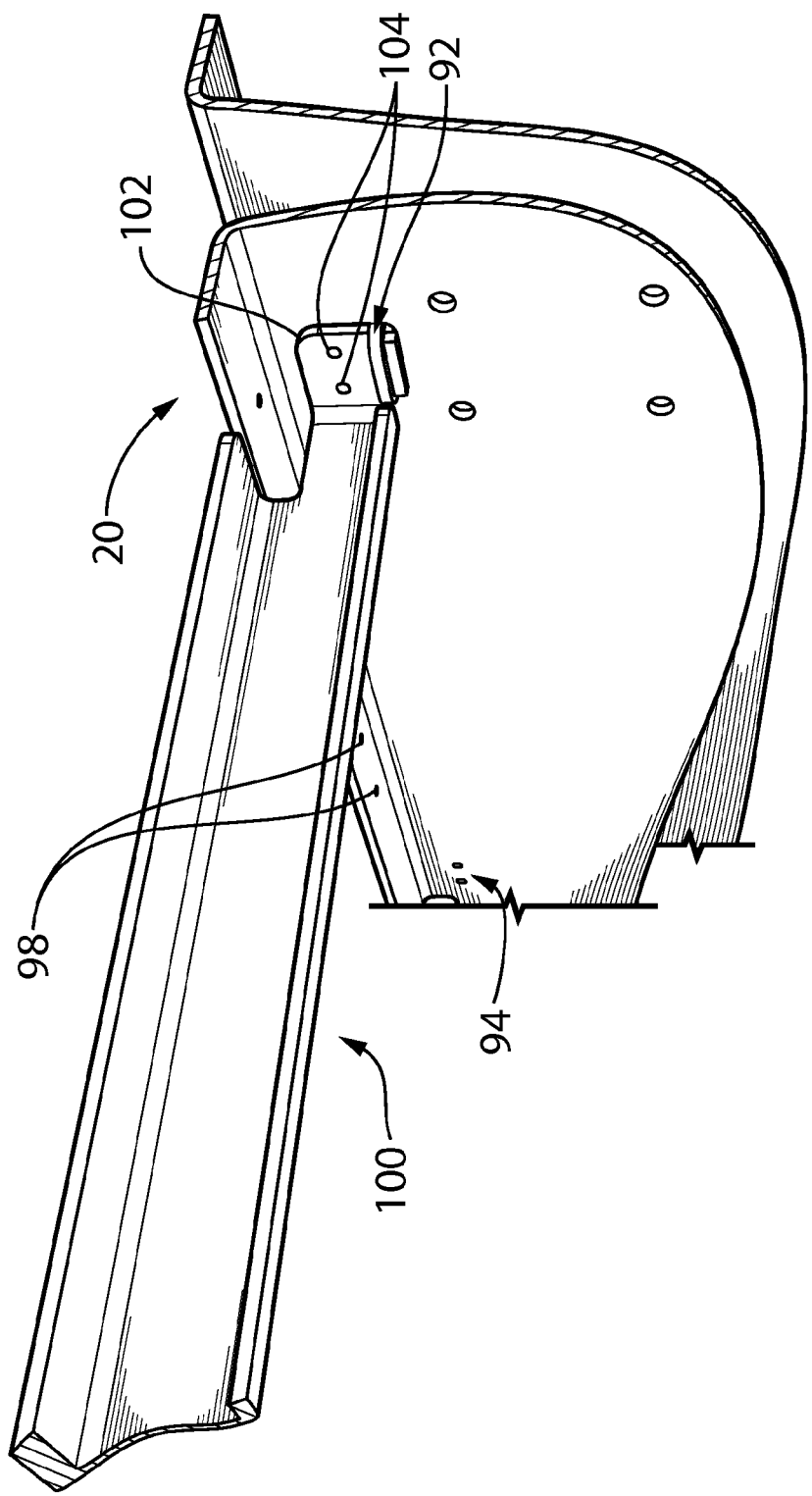
FIG. 9A illustrates a demountable floor anchor system according to an embodiment of the present invention.

Now referring to FIGS. 9A and B. The building structure of the present invention also includes a demountable floor anchor system. The floor anchor system has joists 20 comprising one or more bridge elements 92 located at a predetermined position along the joists 20. The bridge elements 92 may also be spaced apart at fixed regular interval. The joists 20 may comprise at least two joist sections (20A/20B) to be connected together to form the joist 20. The joist sections may be joined together at their ends by securing members 28, which may connect the elongated joist sections by insertion of fasteners in attachment receiving elements present on both structures. The use of joists 20 that are assembled from shorter elongated sections is particularly advantageous as it allows the manufacture of sections that can be handled by one or a few workers without the need for heavy lifting equipment. This is quite advantageous when assembling a housing structure in a wooded area, as trees do not need to be cut to make way for the machinery normally required for assembly of long beams. Furthermore, transportation of the section of joist does not require long and heavy machinery as the sections will fit nicely inside regular truck load. Furthermore, this allows for the joining of multifunctional joist sections that may comprise, for example apertures to receive plumbing, wiring, heating, ventilation, air conditioning (HVAC) ducting, and/or central vacuum ducting.

Figure 10:
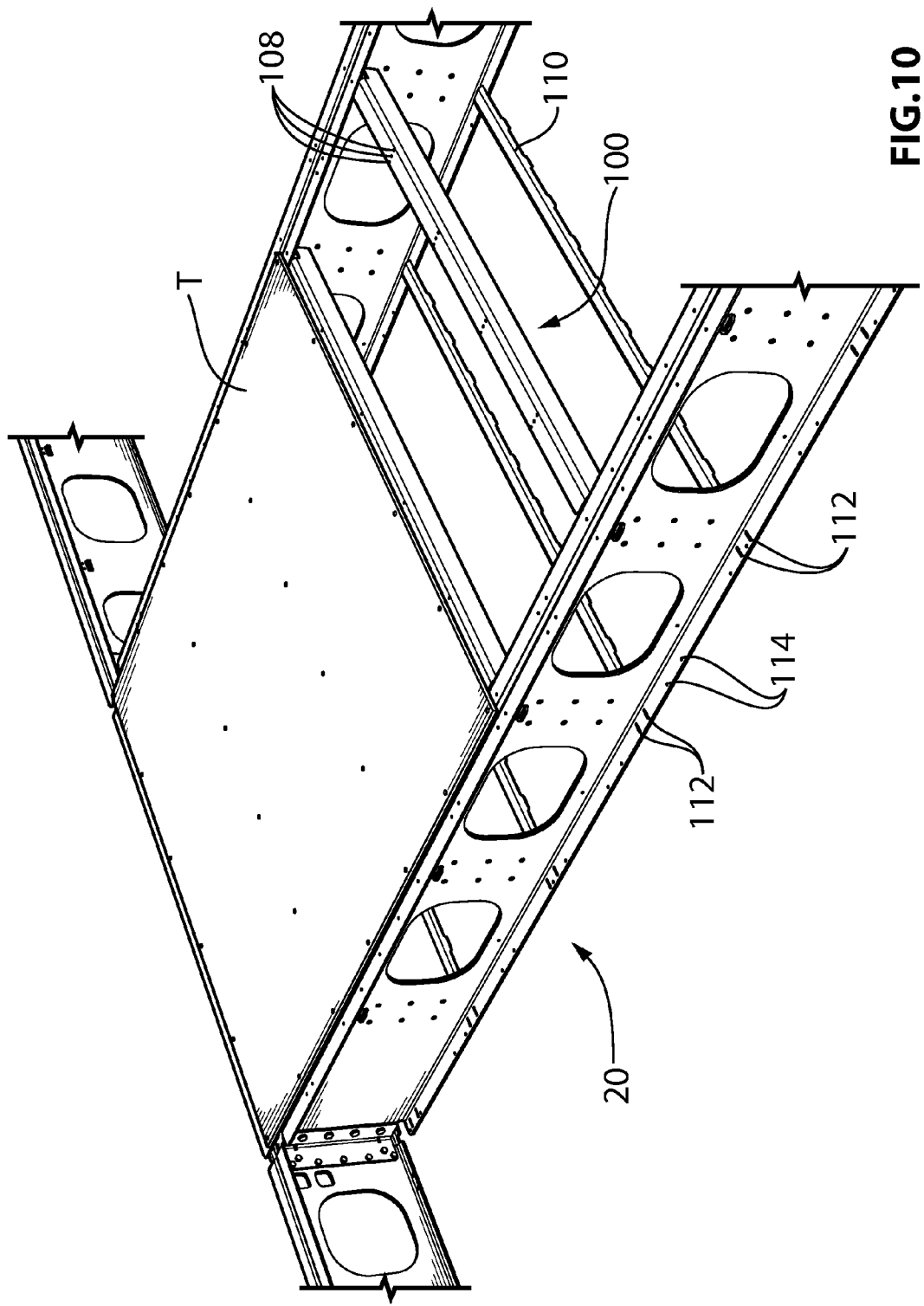
FIG. 10 illustrates a demountable floor anchor system according to an embodiment of the present invention.

The floor anchor system has also secondary joists 100 comprising at each of their end a lug 102 that may be received in the bridge elements 92. The secondary joists 100 are inserted into the joists 20, substantially perpendicular to the joists, forming a planar surface that may receive a flooring surface, for example flooring tile T shown in FIG. 10, or other suitable flooring panels. The floor anchor system of the present invention may be partly or completely demounted and reassembled in a first configuration or a different configuration. This is useful in situations where a flooring surface is necessary to complete a phase of construction on a given floor or level of a building structure, and upon completion of the phase of construction, the flooring may be completely or partly demounted to create, for example, an entry point for further building materials or machinery inside the structure.

Figure 5:
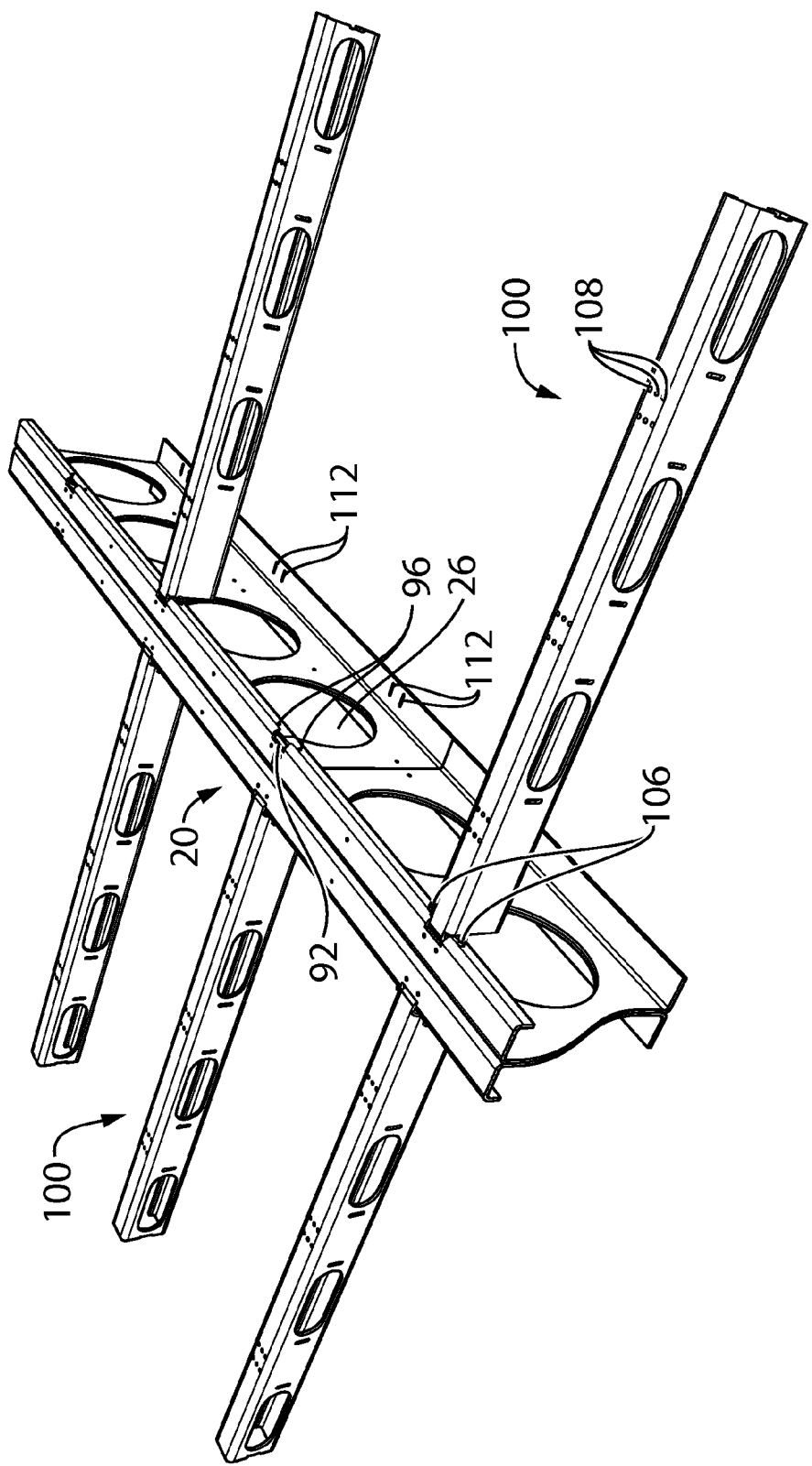
FIG. 5 illustrates a perspective view of a joist or beam according to one embodiment of the present invention.
Figure 9B:
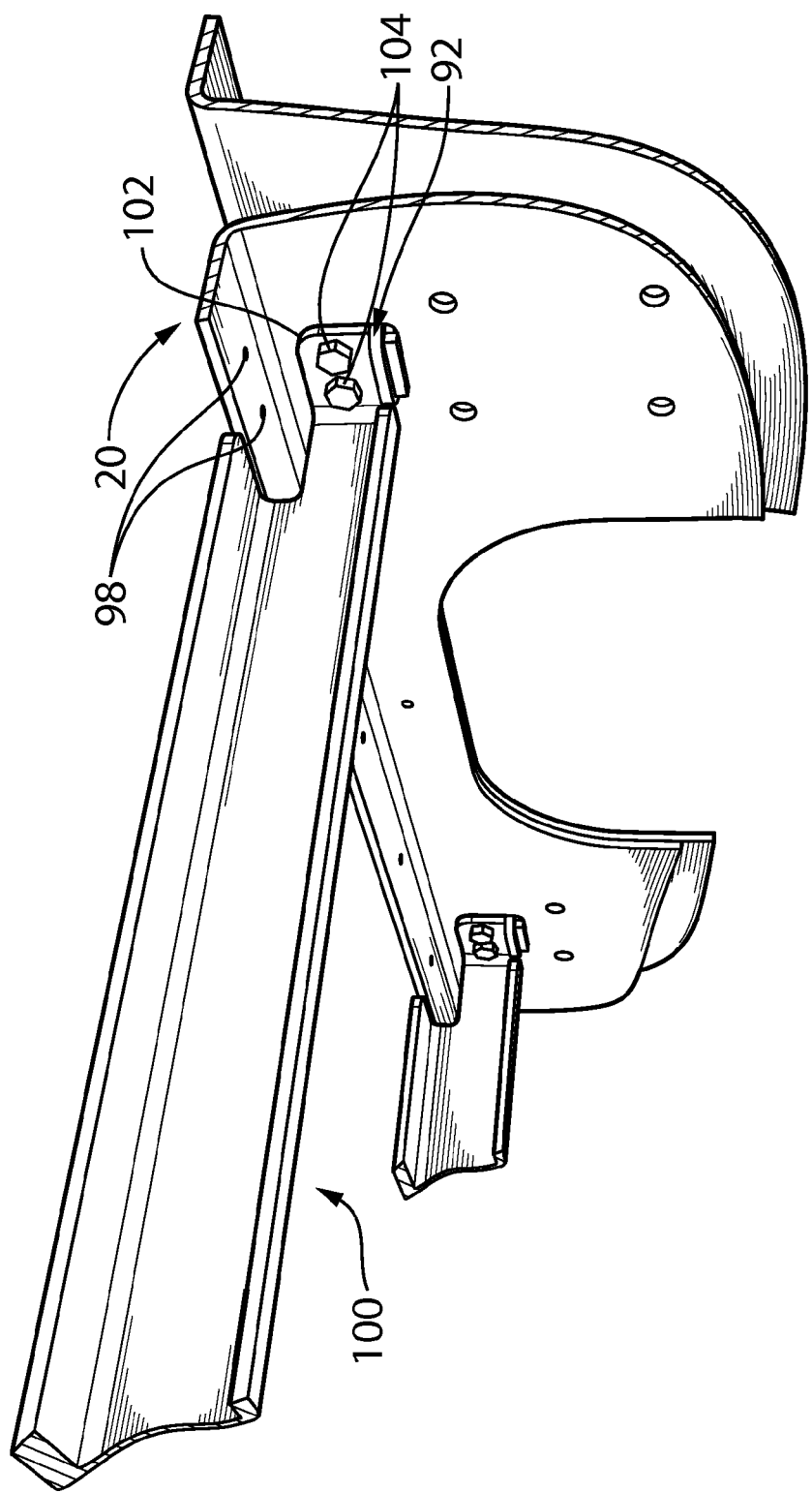
FIG. 9B illustrates a demountable floor anchor system according to an embodiment of the present invention.
Figure 11A:
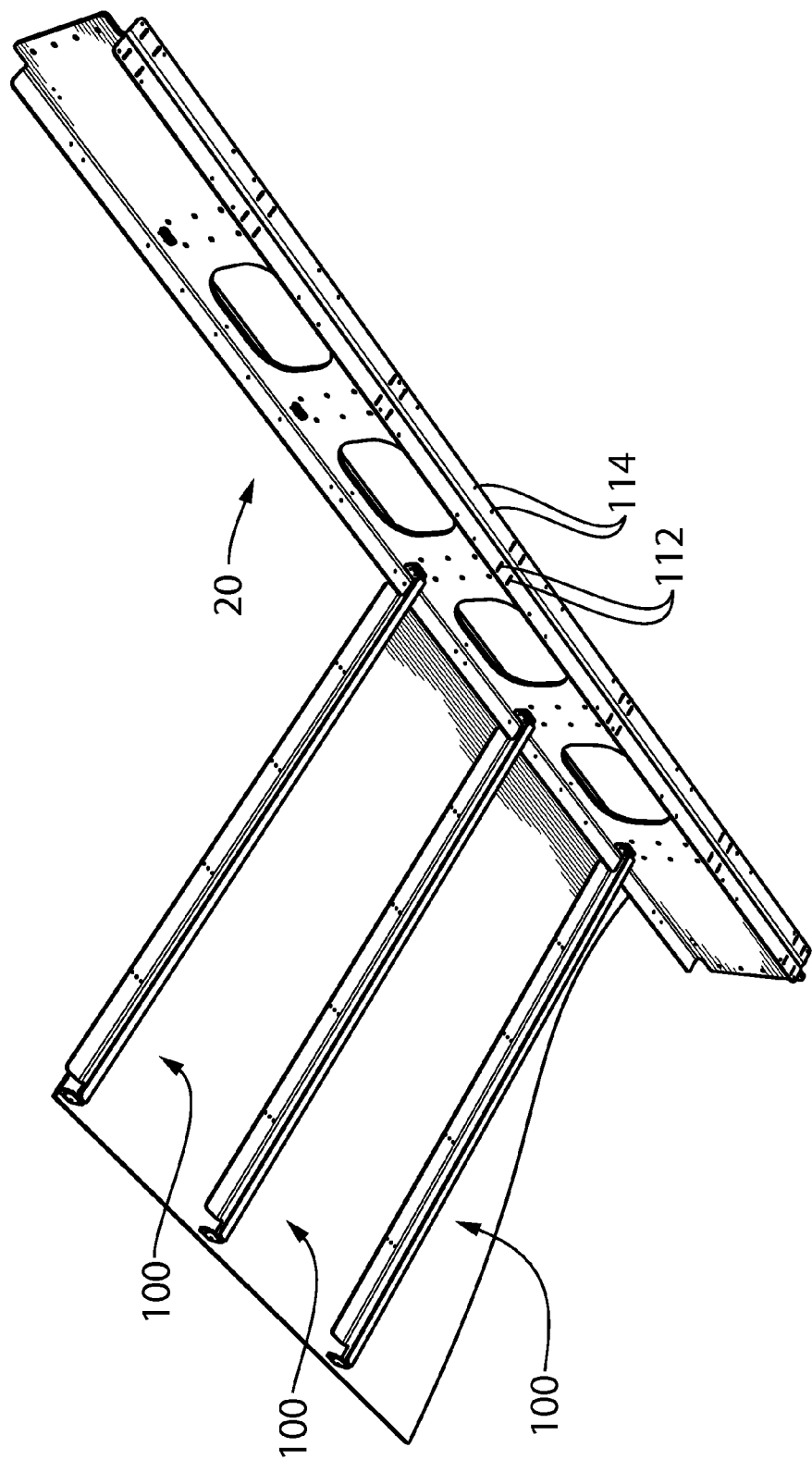
FIG. 11A illustrates a demountable floor anchor system according to an embodiment of the present invention.
Figure 11B:
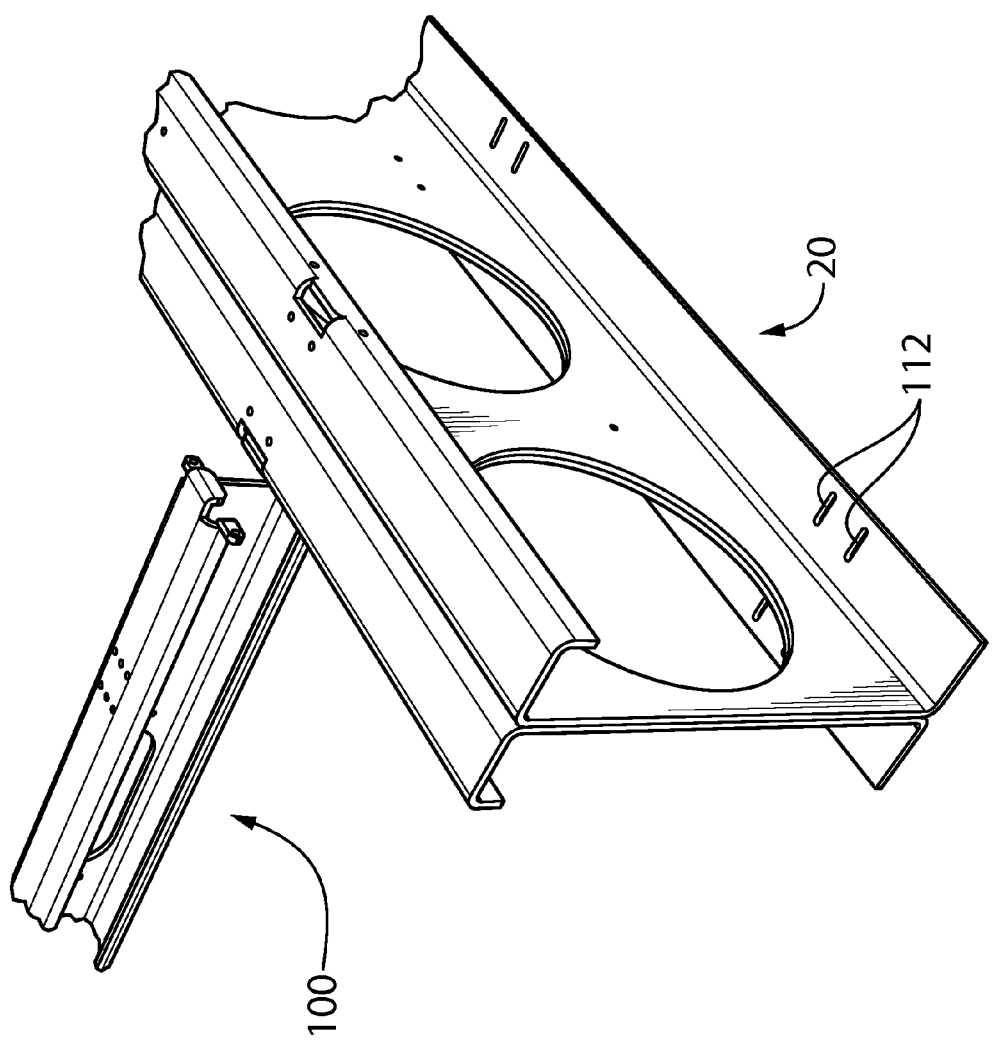
FIG. 11B illustrates a demountable floor anchor system according to an embodiment of the present invention.

To further strengthen the floor anchor system, the joists 20 and the secondary joists 100 may be joined reversibly together. In one embodiment, the lug 102 present on the secondary joists 100 comprises a fastener receiving element 104 that aligns with a fastener receiving element 94 present on the joist 20. Suitable fasteners may be inserted therein to reversibly join the secondary joists 100 to the joists 20 (see FIG. 9). In another embodiment, the secondary joist 100 comprises at each end one or more fastener receiving element 106 that align with a fastener receiving element 96 present on the joist 20. Suitable fasteners may be inserted therein to reversibly join the secondary joists 100 to the joists 20 (see FIGS. 5 and 11).

To further strengthen the flooring surface disposed on the floor anchor system of the present invention, the joists 20 and the secondary joists 100 include one or more fastener receiving elements 98 or 108, that may be disposed at predetermined positions, and/or be spaced apart at fixed regular intervals.

In use, the demountable and reassemblable floor structure is built by assembling a plurality of prefabricated floor components including a plurality of joists 20, and a plurality of secondary joists 100. The plurality of joists 20 are placed parallel to each other, and the lugs 102 of the secondary joists 100 are inserted into each facing bridge elements 92. After assembly, the joists 20 and the secondary joists 100 are substantially perpendicular to each other and form a planar surface that may receive a flooring surface (e.g. floor tiles T). The floor structure is partly or completely demountable and reassemblable in the first configuration or a different configuration by pulling the lugs 102 off the secondary joists 100.

The floor structure may be solidified by fastening the plurality of secondary joists 100 to the plurality of joists 20, and a usable floor may be built by overlaying a flooring surface on the demountable floor structure. Fastening of the plurality of secondary joists 100 to the plurality of joists 20 may be done before or after the flooring surface has been disposed over the planar surface.

Now referring to FIG. 15A-D. After completion of the flooring, ceiling panels may be installed. This may be achieved by disposing perpendicular to the joists 20 a plurality of ceiling furring strip receiving elements 110. The ceiling furring strip receiving elements 110 are inserted in receiving elements 112 which are disposed on the joists 20, preferably at regular intervals. The ceiling furring strip receiving elements 110 may be fastened by regular means, or the end portion inserted into the receiving elements 112 may be bent in order to secure them in the receiving elements 112. Furring strips 130 may then be inserted into the furring strip gripping members 116 which are disposed along the length of the ceiling furring strip receiving elements 110 and have opposed hook members 118 which are separated by a length of the ceiling furring strip receiving elements 110. Ceiling panels may be attached to the furring strips 130 to constitute a ceiling. The ceiling panels may be any type of wall panel, for example a wood, a dry wall panel, etc.

Figure 12B:
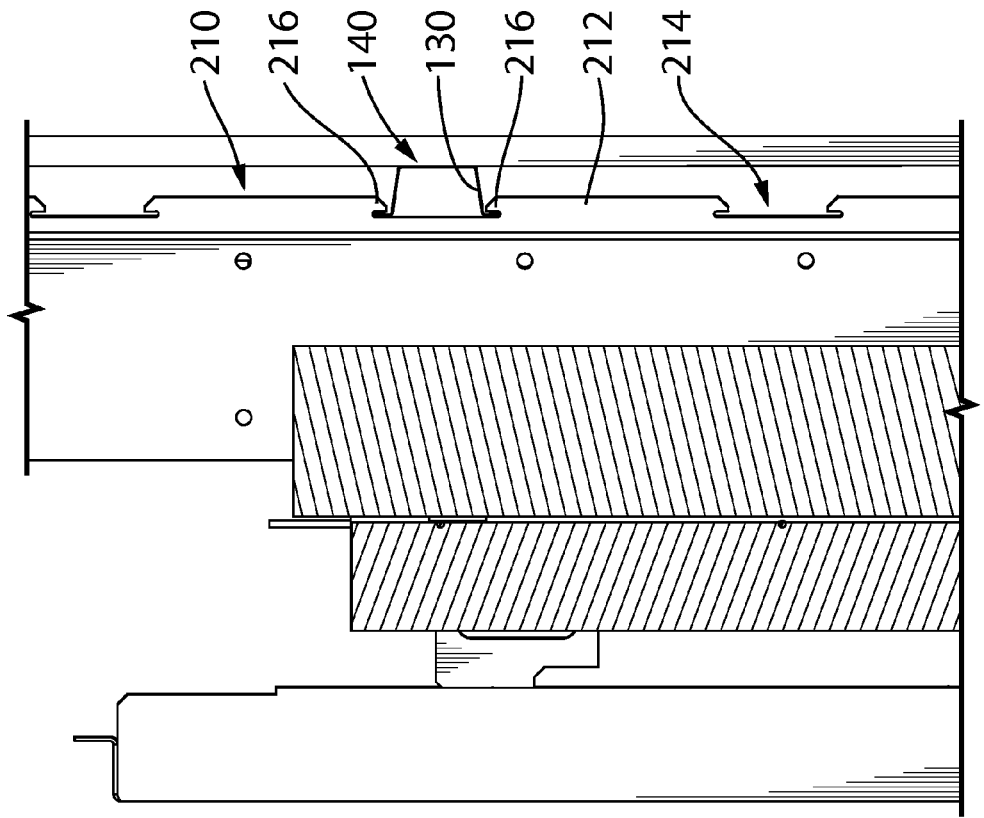
FIG. 12B illustrates a side view of a wall panel support system according to an embodiment of the present invention.
Figure 12A:
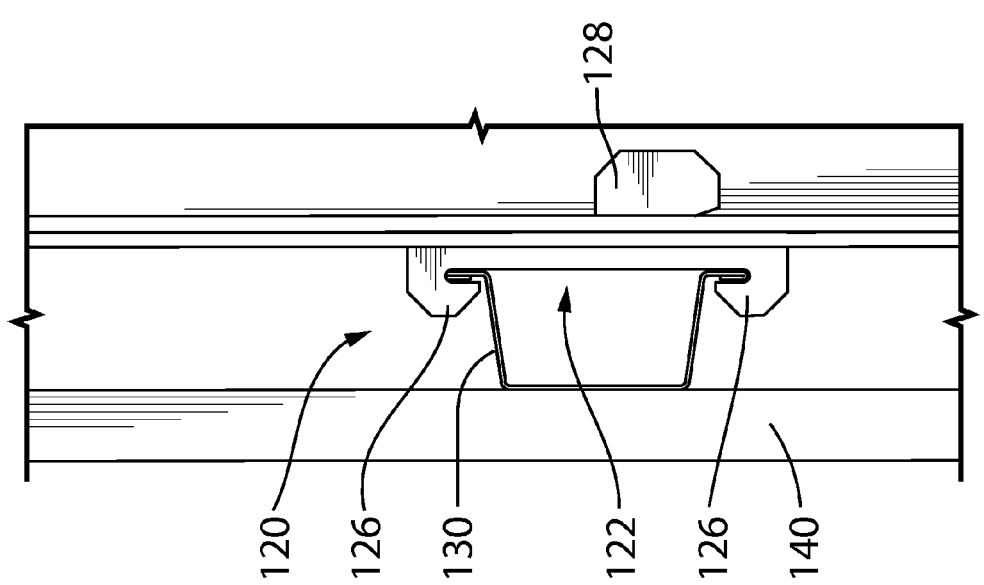
FIG. 12A illustrates a side view of a wall panel support system according to an embodiment of the present invention.

In embodiment, there is also disclosed a kit for a demountable and reassemblable wall. This kit contains a demountable furring strip support 120 (see FIG. 12A) having a demountable furring strip gripping member 122 which comprises one or more spacer 124, and hook members 126 connected at opposite ends of the spacer 124. The demountable furring strip support 120 also has a demountable attachment member 128 that is connected to the demountable furring strip gripping member 122. The demountable attachment member 128 may be received in a compatible attachment receiving element, such as elements 14 of posts 10. The demountable furring strip support 120 may be manufacture as a single, integral piece of material. The material of the furring strip support 120 may be a sound dampening material to provide the assembled walls with an additional level of sound proofing if required. The wall panel may be any type of wall panel, for example a wood, a dry wall panel, etc.

The kit may also comprise another embodiment of a demountable furring strip support 210, which comprises an elongated planar member 212 that includes at least one furring strip gripping member 214 having first and second hooks 214. A plurality of furring strip gripping member may be disposed on the edge of the elongated planar member so as to accommodate several furring strips 130. Furthermore, the elongated planar member comprises a plurality of regularly spaced apart attachment receiving elements that may receive compatible attachments therein so as to affix the furring strip support 210 to a post 10. The demountable furring strip support 210 may comprise two elongated planar member held substantially parallel to each other by a spacer member. For example, the demountable furring strip support 210 may be a U-shaped integral structure.

In use, the demountable and reassemblable wall support system comprises furring strips 130 and two or more furring strip supports 120 or 210. The furring strip 130 is inserted into and supported by the furring strip support 120 or 210, and the assembly may be mounted on substantially elongated posts 10. Also, kits for a demountable and reassemblable wall comprise one or more wall panels 140 that define interior and an exterior, one or more furring strips 130, and two or more furring strip support 120 or 210. The wall panel 140 may be any type of wall panel, for example a wood, a dry wall panel, etc. In use, the furring strips 130 are received by the furring strips supports 120 or 210, and they are mounted into the attachment receiving elements (e.g. elements 14) of two or more substantially elongated posts 10. The wall panels 140 may be fixed to the furring strips 130 prior to or after the furring strips 130 and furring strips supports 120 or 210 have been combined. Once assembled and mounted on the substantially elongated posts 10, the wall panel 140 is spaced from the substantially elongated posts 10 in such a manner that a space is defined between the wall panel 140 and each of the substantially elongated posts 10. The space therein defined substantially reduces thermal bridge effects between the interior and the exterior demountable wall system. To complement the insulation of the wall, an insulation element may be added, engaged between each of the substantially elongated posts 10, adjacent to the wall panel 140. The insulation element may be an insulation panel, an insulation fibre, or insulation foam, sprayed insulation foam (e.g. polyurethane foam), mineral wool, cellulose or any other types of insulation material or combinations thereof.

Figure 13F:
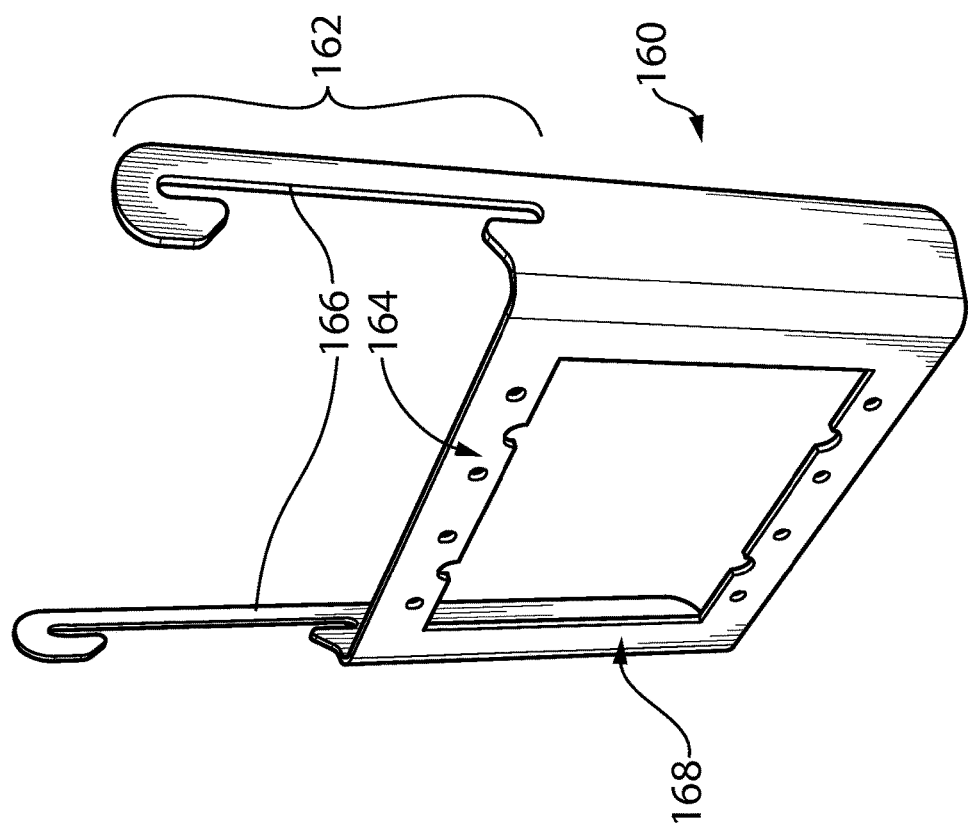
FIG. 13F illustrates a front perspective view of an electrical junction box support according to an embodiment of the present invention.
Figure 13H:
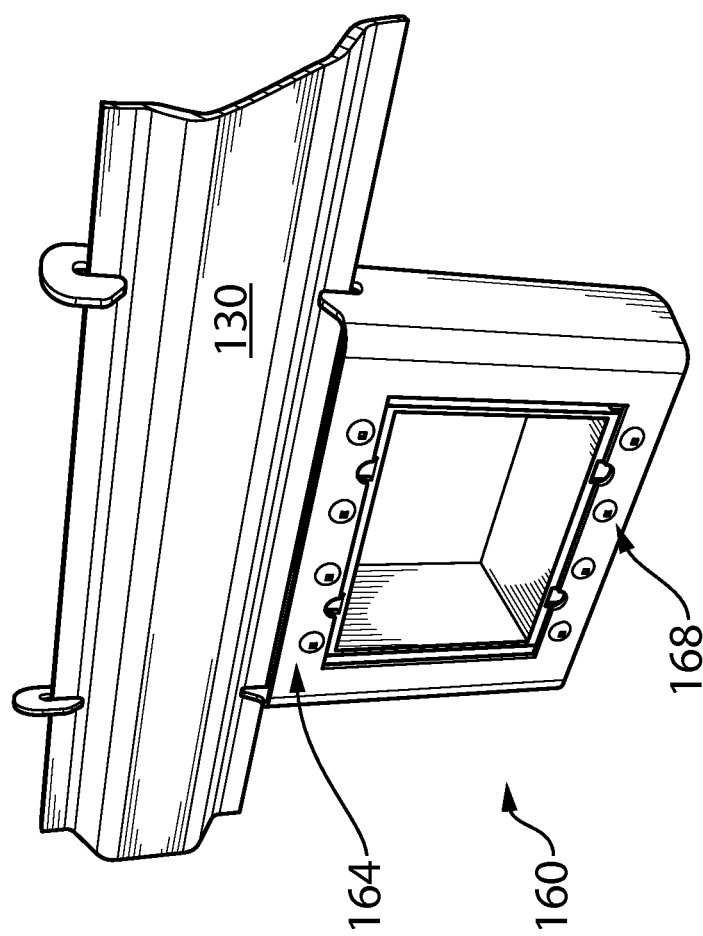
FIG. 13H illustrates a front perspective view of an electrical junction box support according to an embodiment of the present invention.
Figure 13G:
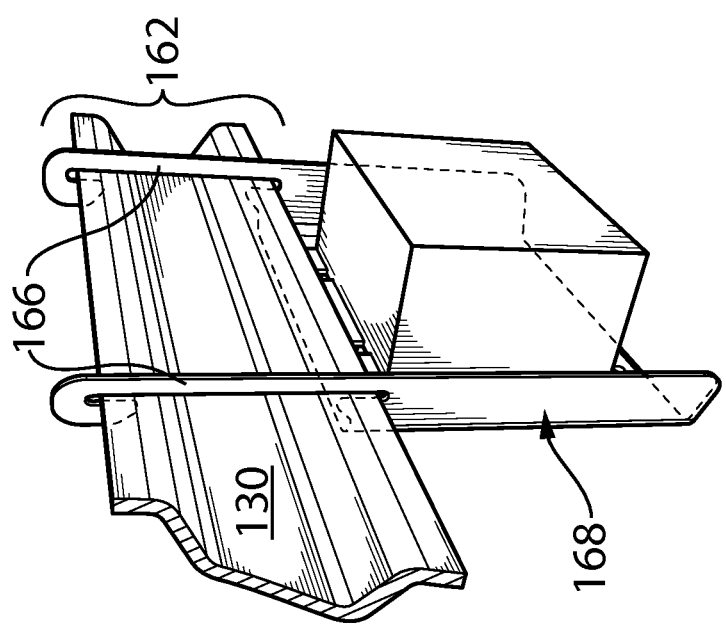
FIG. 13G illustrates a back perspective view of an electrical junction box support according to an embodiment of the present invention.

Now referring to FIG. 13A-J, the present invention also includes a demountable electrical junction box support 160 that comprises a demountable furring strip gripping member 162 which has one or more spacer 164, and hook member 166 connected to the spacer 166. According to one embodiment, the demountable furring strip gripping member 162 may comprise two hook members 166 connected at opposite ends of the spacer 164 (FIG. 13A-J). A housing 168 is connected to the demountable furring strip gripping member 162. The housing 168 contains an aperture that may receive at least one electrical junction box B (FIGS. 13A and B). According to another embodiment, the housing 168 may contain an aperture capable of receiving two or more electrical junction box B or one large, two slotted electrical box B is shown in FIGS. 13D-F, H and J. The demountable electrical junction box support 160 may be built integrally from a single piece of material, and it may also be prepared with an electrical box B already comprised therein. According to one embodiment, the demountable furring strip gripping member 162 may be connected to the spacer 164 at a right angle or at an angle different than a right angle. Preferably, the demountable furring strip gripping member 162 may be connected to the spacer 164 at an obtuse angle (FIG. 13C), for example from about 100° to about 120°, or from about 100° to about 110°, and preferably 110°.

In use, an electrical box B is preferably inserted into the demountable electrical junction box support 160 prior to its positioning on a furring strip 130. The electrical box B may also be inserted after the demountable electrical junction box support 160 is positioned on the furring strip 130. The electrical box B may be fixed to the demountable electrical junction box support 160 through any suitable fixation elements premade in the housing 168 and/or spacer 164. According to one embodiment, the fixation element may be holes premade to receiving conventional fasteners such as screws, but other commonly used means known in the art are also contemplated. For example, complementary clips and grooves, or friction engagement means would be suitable. The demountable electrical junction box support 160 is mounted on the furring strip 130 by the pressure of a hand so that the rims of the furring strip 130 a inserted in the hook member 166. The demountable electrical junction box support 160 allows positioning of the electrical box B at any position on the furring strip 130, irrespective of the position of vertical beams.

Figure 14B:
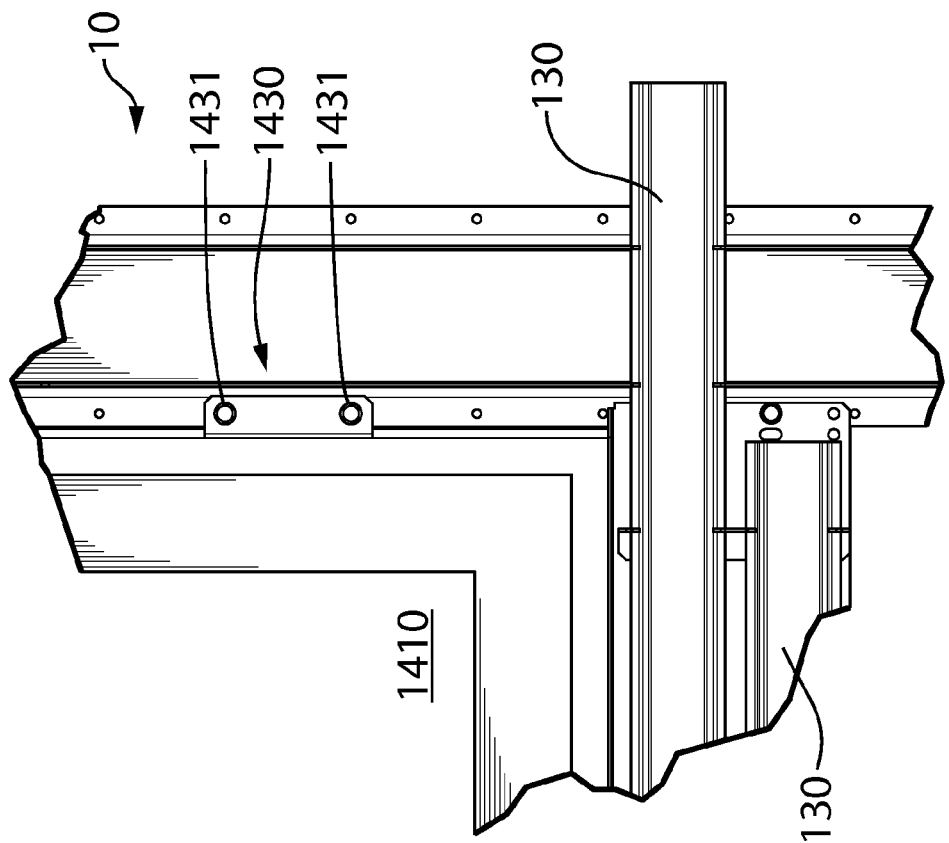
FIG. 14B illustrates a front view of a frame structure according to an embodiment of the present invention.
Figure 14C:
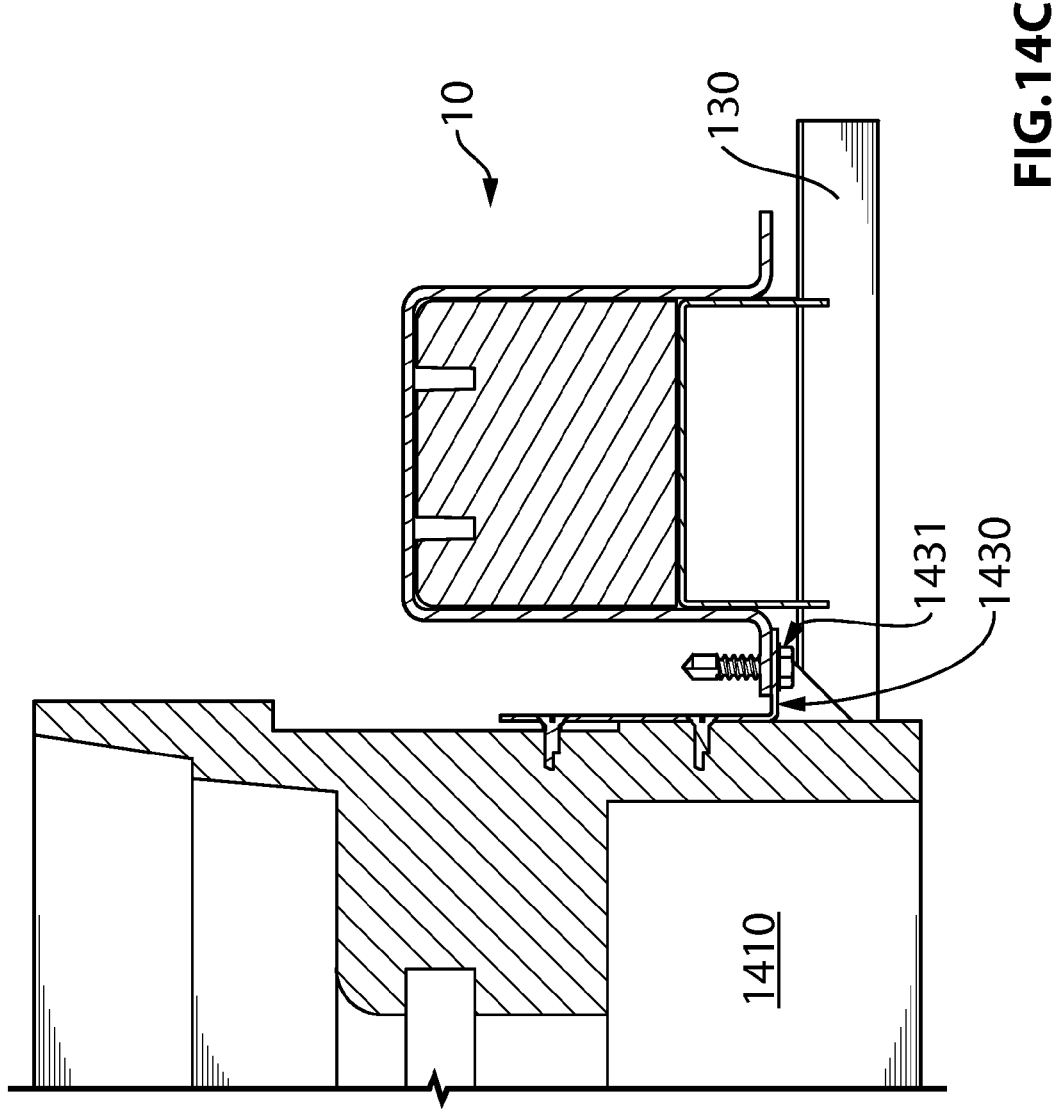
FIG. 14C illustrates a section view of a frame structure according to an embodiment of the present invention.
Figure 15B:
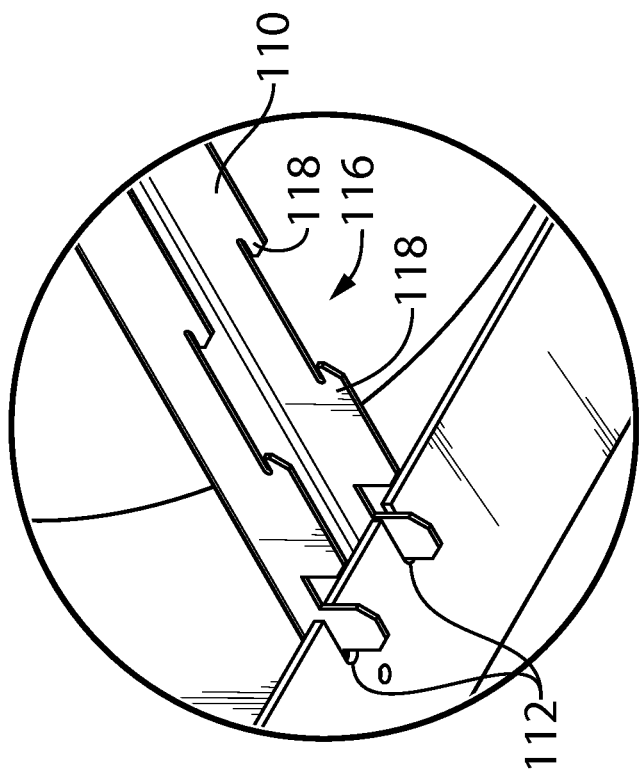
FIG. 15B illustrated a side perspective view of a ceiling furring strip receiving elements according an embodiment of the present invention.
Figure 15A:
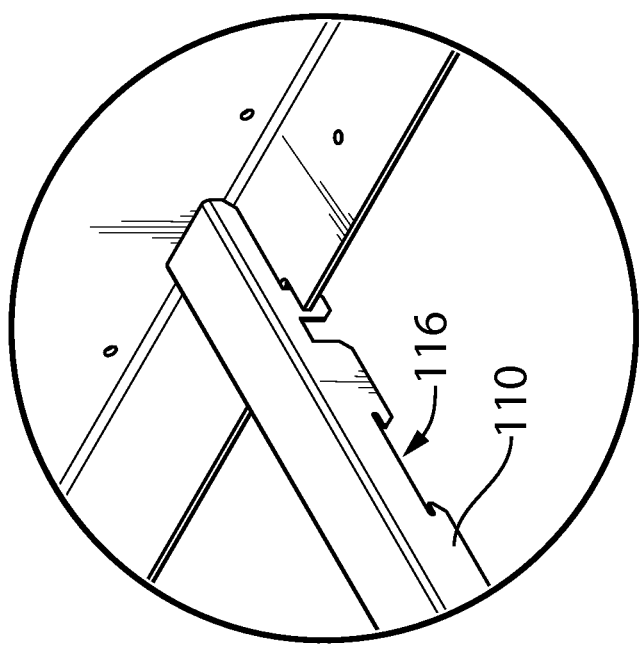
FIG. 15A illustrated a side perspective view of a ceiling furring strip receiving elements according an embodiment of the present invention.
Figure 16D:
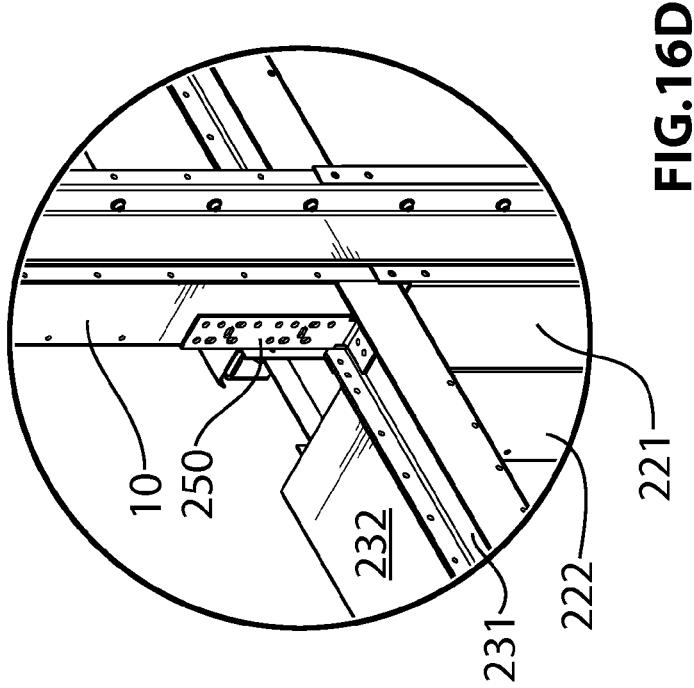
FIG. 16D illustrated a perspective view of a frame assembly according an embodiment of the present invention.
Figure 16C:
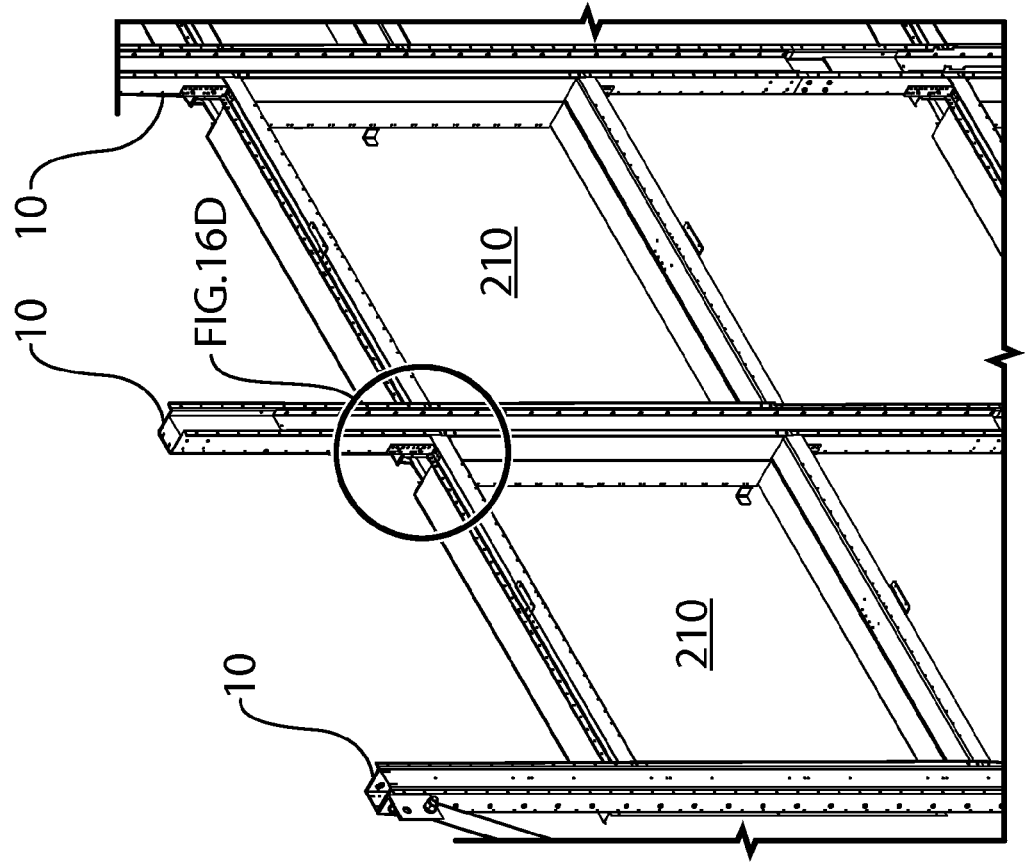
FIG. 16C illustrated a perspective view of a frame assembly according an embodiment of the present invention.

Now referring to FIG. 14A-C. The present invention also includes a kit for a demountable and reassemblable frame 1400 comprising a frame assembly 1410 such as a window assembly or a door assembly, having an interior and an exterior surface. The interior of the frame assembly has at least two frame assembly attachments 1430 facing the interior surface. The frame assembly attachments 1430 may secure the frame assembly 1400 to a respective first and second substantially parallel post 10. The posts 10 have a plurality of regularly spaced apart attachment receiving elements that may receive the frame assembly attachments 1430, by insertion, for example, of a fastener 1431. Alternatively, the frame assembly attachments 1430 may be configured to directly insert and secure into the attachment receiving elements. The frame 1400 also comprises a first and second furring strip receiving bar 1420 which comprises at least one furring strip gripping member 1440 that may receive at least one furring strip 130. The furring strip receiving bar 1420 may be secured substantially perpendicular to each of the substantially parallel posts to form a border around the frame assembly 1400. The furring strip gripping member 1440 comprises first and second hook members, opposed and facing each other so as to secure a furring strip therein. The furring strip receiving bar 1420 may receive two or more furring strips 130.

The demountable and reassemblable frame 1400 is particularly advantageous to easily install windows in a building structure according to the present invention. Windows are commonly installed from the exterior of the building, where they are inserted in the space prepared for such purpose. This does not pose particular problems for windows that are installed at ground level, but for windows that are installed above ground level, workers must lift the windows frames to the appropriate height, using lifting equipment and/or scaffolding. This type of work always comprises a degree of risk to the workers that may fall off the equipment or scaffolding. With the frame of the present invention, the window frames are preferably simply brought inside the building structure, and workers only need to slide them in the aperture define by the posts 10 and the furring strip receiving bar 1420, and secure them as required. All the work may be performed inside the structure, where the risk of falling a great distance to the ground is practically inexistent. The window frames 1400 may also be installed from the exterior of the building structure if desired.

Now referring to FIG. 16A-D. The present invention also includes a kit for a demountable and reassemblable frame assembly 200 defining an aperture 210, and comprising vertical frame elements 220 and horizontal frame elements 230, and at least two frame assembly attachments 250. The frame 200 may be used to frame window assembly 215 or a door assembly, having an interior and an exterior surface. The frame assembly attachments 250 may secure the frame assembly 200 to a respective first and second substantially parallel post 10. The posts 10 have a plurality of regularly spaced apart attachment receiving elements that may receive the frame assembly attachments 250, by insertion, for example, of a fastener. Alternatively, the frame assembly attachments 250 may be configured to directly insert and secure into the attachment receiving elements. According to some embodiments, the frame assembly attachments 250 may connect to regularly spaced apart attachment receiving elements on the surface of the posts 10 which is parallel and adjacent to the vertical frame elements 220 (such as in FIG. 16C-D). According to another embodiment, the frame assembly attachments 250 may be shaped and/or positioned to connect to regularly spaced apart attachment receiving elements on the surface of the posts 10 which is perpendicular to the vertical frame elements 220. The vertical and horizontal frame elements 220 and 230 may be manufactured as unitary elements, or they may be manufactured as several element such as first and second vertical frame elements 221 and 222, and first and second horizontal frame elements 231 and 232, which may also be fastened to the posts 10 by insertion of fasteners into regularly spaced apart attachment receiving elements. The frame assembly 200 may be assembled prior to insertion of the window assembly 215, such that insulation material may also be added prior to the insertion of the window assembly. This is convenient in cases where the window assembly is made from a material that may be deformed by the pressure caused by the expansion of sprayed insulation material, for example, PVC made window assemblies. The window frames 200 may also be installed from the exterior of the building structure if desired.

The embodiments and examples presented herein are illustrative of the general nature of the subject matter claimed and are not limiting. It will be understood by those skilled in the art how these embodiments can be readily modified and/or adapted for various applications and in various ways without departing from the spirit and scope of the subject matter disclosed claimed. The claims hereof are to be understood to include without limitation all alternative embodiments and equivalents of the subject matter hereof. Phrases, words and terms employed herein are illustrative and are not limiting. Where permissible by law, all references cited herein are incorporated by reference in their entirety. It will be appreciated that any aspects of the different embodiments disclosed herein may be combined in a range of possible alternative embodiments, and alternative combinations of features, all of which varied combinations of features are to be understood to form a part of the subject matter claimed.

The invention claimed is:

1. A measurement free system for building a demountable and reassemblable building structure comprising:
   a plurality of prefabricated building components comprising a plurality of posts and joists, each having a plurality of regularly spaced apart attachment receiving elements;
   a plurality of removable attachments for engaging into the plurality of regularly spaced apart attachment receiving elements for demountably joining the plurality of posts and joists, wherein the plurality of regularly spaced apart attachment receiving elements allow for assembling measurement free building structures which are demountable and re-assemblable in a plurality of configurations distinct from each other; and
a demountable ceiling anchor system comprising:
   at least two joists among the plurality of prefabricated building components, each of said at least two joists comprising receiving elements located along each joist at a predetermined position when the at least two joists are prefabricated prior to building the demountable and reassemblable building structure, for receiving a ceiling furring strip receiving element;
   at least two ceiling furring strip receiving elements; said at least two ceiling furring strip receiving elements being disposed spaced apart of each other and having a length extending perpendicular to a length of the at least two joists, each of the two ceiling furring strip receiving elements comprising at least one furring strip gripping member;
   at least two furring strips to be inserted into two corresponding ones of the furring strip gripping members of the at least two ceiling furring strip receiving elements such that the at least two furring strips have lengths extending parallel to the at least two joists; wherein said at least two furring strips are inserted in each of said furring strip gripping members to form a planar surface to receive a ceiling surface.

2. The measurement free system for building a demountable and reassemblable building structure of claim 1, further comprising a demountable exterior wall panel attachment comprising:
   a first demountable attachment member, to be received in a compatible attachment receiving element;
   a second demountable attachment member, to receive a compatible exterior wall panel; and
   a spacer, connecting the first and second demountable attachment members.

3. The measurement free system for building a demountable and reassemblable building structure of claim 1, further comprising a post anchor adjustable along three dimensional axes comprising:
   a base member to be anchored into a building foundation and having a mounting member thereon, the mounting member being adjustable along a first axis; and
   a retaining member having
      a seat, mountable on the mounting member and being adjustable along a second axis, and
      a crown, to receive a post and being adjustable along a third axis,
wherein the post anchor is adjustable along the three dimensional axes to align the post anchor to a foundation and level the post attached thereto.

4. The measurement free system for building a demountable and reassemblable building structure of claim 1, further comprising a kit for a demountable floor anchor system comprising:
   at least two joists, each of the at least two joists comprising at least one bridge element located at a predetermined position along each joist; and
   at least one secondary joist comprising at each end a lug to be received in the at least one bridge element, wherein when the at least one secondary joist is inserted into each of the at least two joists, the at least one secondary joist is substantially perpendicular to the at least two joists, and forms a planar surface to receive a flooring surface, and
wherein the demountable floor anchor system can be partly or completely demounted and reassembled in a first floor configuration or a floor configuration different than the first floor configuration.

5. The measurement free system for building a demountable and reassemblable building structure of claim 1, further comprising a demountable floor structure comprising a plurality of secondary joists, wherein the plurality of joists and the plurality of secondary joists are substantially perpendicular to each other and form a planar surface to receive a flooring surface.

6. The measurement free system for building a demountable and reassemblable building structure of claim 5, further comprising a demountable furring strip support comprising:
   a demountable furring strip gripping member comprising at least one of
      a spacer, and
      a first and second hook member connected at opposite ends of the spacer; and
   a demountable attachment member, to be received in a compatible attachment receiving element and connected to the demountable furring strip gripping member.

7. The measurement free system for building a demountable and reassemblable building structure of claim 5, further comprising a demountable furring strip support comprising:
   at least one elongated planar member comprising
      at least one furring strip gripping member having a first and second hook member to secure a furring strip; and
      a plurality of regularly spaced apart attachment receiving elements to receive compatible attachments.

8. The measurement free system for building a demountable and reassemblable building structure of claim 1, further comprising a demountable electrical junction box support comprising:
   a demountable furring strip gripping member comprising at least one of
      a spacer, and
      a hook member connected to the spacer; and
   a housing, connected to the demountable furring strip gripping member, the housing comprising an aperture to receive at least one demountable electrical junction box.

9. The measurement free system for building a demountable and reassemblable building structure of claim 1, further comprising a kit for a demountable and reassemblable frame comprising:
   a frame assembly having an interior surface and an exterior surface comprising
      at least two frame assembly attachments facing the interior surface to secure the frame assembly to respective first and second substantially parallel posts,
      each post having a plurality of regularly spaced apart attachment receiving elements to receive the at least two frame assembly attachments;
   a first and second furring strip receiving bar comprising
      at least one furring strip gripping member to receive at least one furring strip;
      the first and second furring strip receiving bars adapted to be secured substantially perpendicular to the first and second substantially parallel posts to form a border around the frame assembly.

10. The measurement free system for building a demountable and reassemblable building structure of claim 1, further comprising a kit for a demountable and reassemblable frame comprising:
   a frame assembly having
      at least two horizontal frame elements, substantially parallel to one another,
      at least two vertical elements substantially parallel to one another, defining an aperture, and
      at least two frame assembly attachments to secure the frame assembly to one of the respective first and second substantially parallel posts,
   wherein each of the first and second substantially parallel posts include a plurality of regularly spaced apart attachment receiving elements to receive the at least two frame assembly attachments.

11. The measurement free system as defined in claim 1, wherein the plurality of joists comprises at least one elongated joist section, to be connected together to form each joist of the plurality of joists.

12. The measurement free system as defined in claim 11, wherein the at least one elongated joist section comprises at least two elongated joist sections, wherein the joist further comprises at least one securing member to join the at least two elongated joist sections together to form the joist.

13. The measurement free system as defined in claim 12, wherein the first and the second substantially parallel posts and the plurality of joists each further comprise at least one aperture to receive plumbing wiring, heating, ventilation, air conditioning (HVAC) ducting, and/or central vacuum ducting.

14. The measurement free system as defined in claim 1, comprising:
   an exterior wall panel defining an interior surface and an exterior of the demountable and reassemblable building structure comprising a first exterior wall panel attachment and a second exterior wall panel attachment;
   at least two substantially elongated posts, each of the first and second substantially parallel posts comprising at least one attachment receiving element for receiving a respective one of the first and second exterior wall panel attachments so that when the first and second wall panel attachments are received by the plurality of regularly spaced apart attachment receiving elements, the exterior wall panel is spaced from the at least two posts defining a space between the exterior wall panel and each of the first and second substantially parallel posts; and
   an insulation adapted to be engaged between each of the posts, adjacent the exterior wall panel,
   wherein the space substantially reduces a thermal bridge effect between the interior and the exterior of the structure and wherein the demountable and reassemblable building structure is adapted to be partly or completely demounted and reassembled in a first configuration or configuration different form the first configuration.

15. A measurement free system for building a demountable and reassemblable building structure comprising:
   a plurality of prefabricated building components comprising a plurality of posts and joists, each having a plurality of regularly spaced apart attachment receiving elements;
   a plurality of removable attachments for engaging into the plurality of regularly spaced apart attachment receiving elements for demountably joining the plurality of posts and joists, wherein the plurality of regularly spaced apart attachment receiving elements allow for assembling measurement free building structures which are demountable and re-assemblable in a plurality of configurations distinct from each other; and
   a demountable ceiling anchor system comprising:
      at least two joists among the plurality of prefabricated building components, each of said at least two joists comprising receiving elements located, along each joist, at a predetermined position when the at least two joists are prefabricated to building the demountable and reassemblable building structure, for receiving a ceiling furring strip receiving element;
      at least two ceiling furring strip receiving elements, each of said at least two ceiling furring strip receiving elements comprising furring strip gripping members located at a predetermined position along the at least two ceiling furring strip receiving elements for receiving a furring strip; said at least two ceiling furring strip receiving elements extending in a length perpendicular to a length of the at least two joists;
      at least two furring strips to be inserted into two furring strip gripping members of at least two ceiling furring strip receiving elements, said at least two furring strips being disposed perpendicular to the at least two ceiling strips receiving elements when inserted in the furring strip gripping members of said at least two ceiling furring strip receiving elements, such that the at least two furring strips have lengths extending parallel to the plurality of joists, and forming a planar surface to receive a ceiling surface.

* * * * *